US011847744B2

(12) United States Patent
Richter

(10) Patent No.: US 11,847,744 B2
(45) Date of Patent: Dec. 19, 2023

(54) INTERMEDIARY EMERGENT CONTENT

(71) Applicant: Apple Inc., Cupertino, CA (US)

(72) Inventor: Ian M. Richter, Los Angeles, CA (US)

(73) Assignee: APPLE INC., Cupertino, CA (US)

( * ) Notice: Subject to any disclaimer, the term of this patent is extended or adjusted under 35 U.S.C. 154(b) by 56 days.

(21) Appl. No.: 17/709,871

(22) Filed: Mar. 31, 2022

(65) Prior Publication Data

US 2022/0222898 A1 Jul. 14, 2022

Related U.S. Application Data

(63) Continuation of application No. 17/267,985, filed as application No. PCT/US2019/052857 on Sep. 25, 2019, now Pat. No. 11,341,725.

(60) Provisional application No. 62/737,768, filed on Sep. 27, 2018.

(51) Int. Cl.

| G06T 19/00 | (2011.01) |
| G06F 3/01 | (2006.01) |
| G06N 3/04 | (2023.01) |

(52) U.S. Cl.
CPC ............ *G06T 19/00* (2013.01); *G06F 3/011* (2013.01); *G06N 3/04* (2013.01); *G06T 2200/24* (2013.01); *G06T 2210/61* (2013.01)

(58) Field of Classification Search
CPC . G06T 19/00; G06T 2200/24; G06T 2210/61; G06F 3/011
See application file for complete search history.

(56) References Cited

U.S. PATENT DOCUMENTS

| 6,351,545 | B1 | 2/2002 | Edelson et al. |
| 2001/0043218 | A1 | 11/2001 | Hoddie et al. |
| 2007/0174774 | A1 | 7/2007 | Lerman et al. |
| 2007/0242080 | A1 | 10/2007 | Hamada et al. |
| 2008/0097948 | A1* | 4/2008 | Funge ............ G06N 20/00 706/47 |
| 2010/0231593 | A1 | 9/2010 | Zhou et al. |
| 2012/0098925 | A1 | 4/2012 | Dasher et al. |

(Continued)

OTHER PUBLICATIONS

Kuijk, Fons, "A Framework for Human-like Behavior in an Immersive Virtual World", 2013 18th International Conference on Digital Signal Processing (DSP), pp. 1-7, (Year: 2013).*

(Continued)

*Primary Examiner* — Terrell M Robinson
(74) *Attorney, Agent, or Firm* — Fernando & Partners, LLP

(57) ABSTRACT

In some implementations, a method includes obtaining an end state of a first content item spanning a first time duration. In some implementations, the end state of the first content item indicates a first state of a synthesized reality (SR) agent at the end of the first time duration. In some implementations, the method includes obtaining an initial state of a second content item spanning a second time duration subsequent the first time duration. In some implementations, the initial state of the second content item indicates a second state of the SR agent at the beginning of the second time duration. In some implementations, the method includes synthesizing an intermediary emergent content item spanning over an intermediary time duration that is between the end of the first time duration and the beginning of the second time duration.

20 Claims, 30 Drawing Sheets

(56) References Cited

U.S. PATENT DOCUMENTS

| | | | |
|---|---|---|---|
| 2013/0135315 A1* | 5/2013 | Bares | G11B 27/031 345/473 |
| 2014/0004950 A1* | 1/2014 | Szufnara | A63F 13/45 463/43 |
| 2016/0067616 A1* | 3/2016 | Yim | G06T 19/006 463/34 |
| 2017/0084001 A1 | 3/2017 | Holzer et al. | |
| 2018/0336415 A1* | 11/2018 | Anorga | G06N 20/00 |
| 2019/0004783 A1* | 1/2019 | Fernandez | G06F 8/61 |
| 2019/0321730 A1* | 10/2019 | Shetty | A63F 13/67 |
| 2021/0248789 A1* | 8/2021 | Du | G06F 16/9538 |

OTHER PUBLICATIONS

Lake, Brenden, "Building Machines That Learn and Think Like People", Nov. 2016, Behavioral and Brain Sciences, pp. 1-58 (Year: 2016).*

Peng, Xue Bin, "DeepLoco: Dynamic Locomotion Skills Using Hierarchical Deep Reinforcement Learning", Jul. 2017 ACM Transactions on Graphics vol. 36, pp. 1-13 (Year: 2017).*

International Search Report and Written Opinion dated Feb. 27, 2020, International Application No. PCT/US2019/052857, pp. 1-4.

Xiongtao Chen et al., "Long-Term Video Interpolation with Bidirectional Predictive Network," 2017 IEEE Visual Communications and Image Processing, Dec. 2017, pp. 1-4.

Shenchang Eric Chen, "QuickTime VR—An Image-Based Approach to Virtual Environment Navigation," Proceedings of the 22nd Annual Conference on Computer Graphics and Interactive Techniques, 1995, pp. 29-38.

* cited by examiner

550

Generate customized gap content

Select plot template:
552 —
- ○ Mystery ○ ~~~ ⊘ ~~~ ○ ~~~
- ⊘ Rescue ○ ~~~ ○ ~~~ ○ ~~~
- ○ Disaster ⊘ ~~~ ○ ~~~ ⊘ ~~~

Specify location for gap content:
554 —
- ○ Auto
- ⊘ Where Episode 1 ends
- ○ Where Episode 2 begins
- Other: [        ]

Select characters for gap content

| From Episode 1 | From Episode 2 | New Characters |
|---|---|---|
| ☐ ~~~ | ☐ ~~~ | ☐ ~~~ |
| ☒ ~~~ | ☐ ~~~ | ☐ ~~~ |
| ☐ ~~~ | ☐ ~~~ | ☐ ~~~ |

556 —

Other: [        ]

Select time duration:
558 —
- ○ 30 min
- ○ 60 min
- Other: [        ]

[ Generate gap content ]

Figure 5H

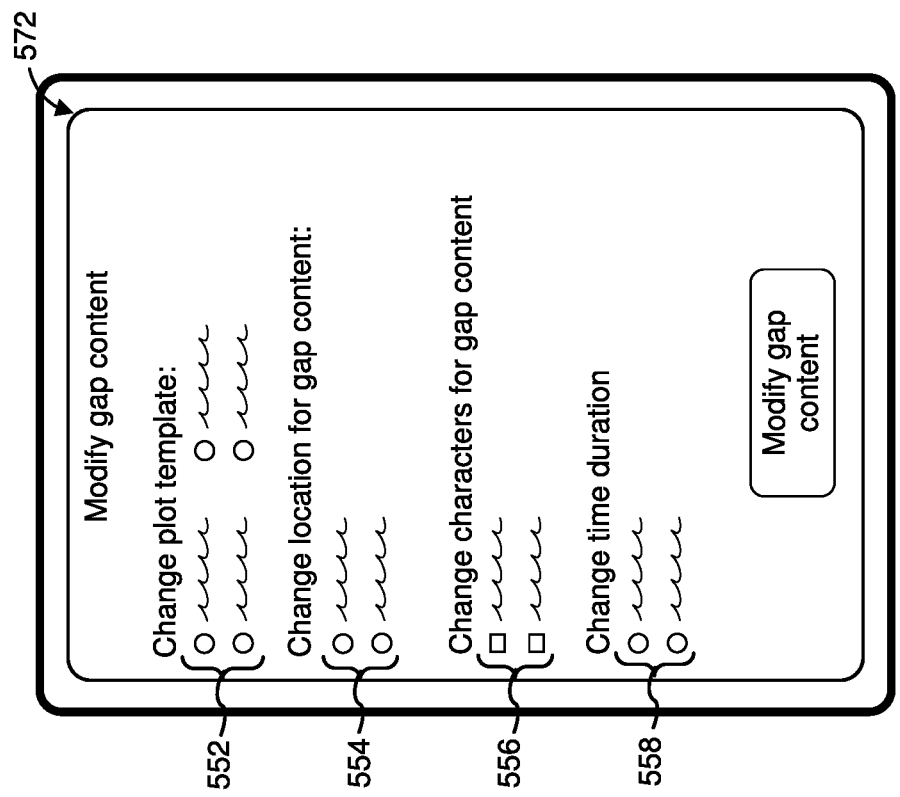
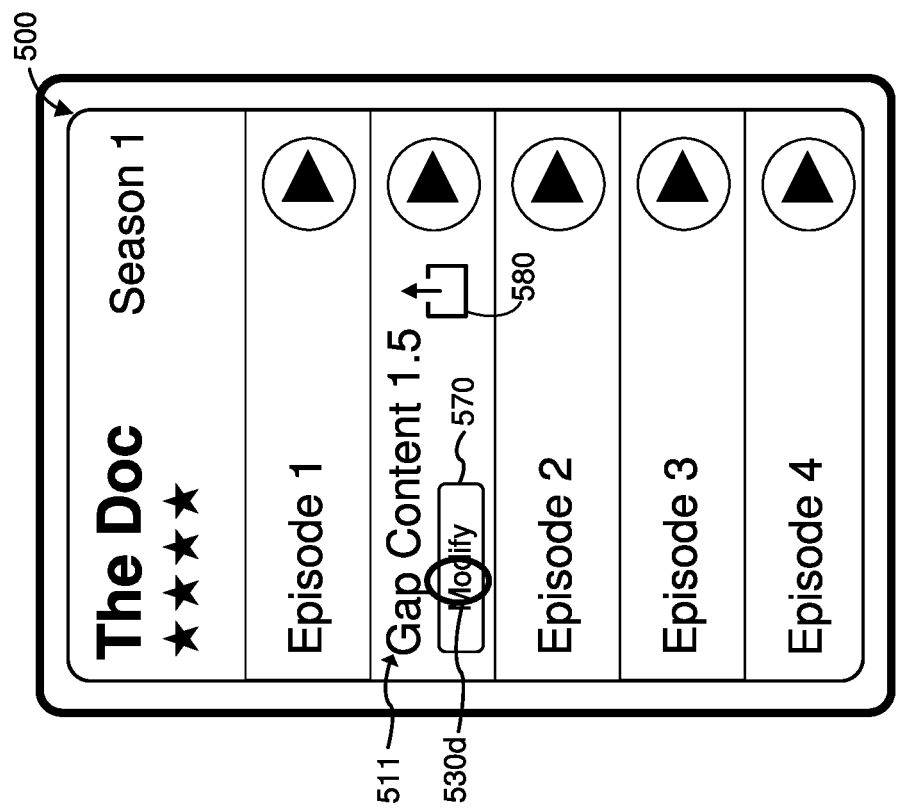
Figure 5J
Figure 5I

INTERMEDIARY EMERGENT CONTENT

CROSS REFERENCE TO RELATED APPLICATIONS

This application is a continuation of U.S. patent application Ser. No. 17/267,985 filed on Feb. 11, 2021, which is a national phase entry of PCT application number PCT/US19/52857 filed on Sep. 25, 2019, which claims priority to U.S. patent application No. 62/737,768, filed on Sep. 27, 2018, which are hereby incorporated by reference in their entirety.

TECHNICAL FIELD

The present disclosure generally relates to intermediary emergent content.

BACKGROUND

Some devices are capable of generating and presenting synthesized reality (SR) settings. Some SR settings include virtual settings that are simulated replacements of physical settings. Some SR settings include augmented settings that are modified versions of physical settings. Some devices that present SR settings include mobile communication devices such as smartphones, head-mountable displays (HMDs), eyeglasses, heads-up displays (HUDs), and optical projection systems. Most previously available devices that present SR settings are ineffective at presenting representations of certain objects. For example, some previously available devices that present SR settings are unsuitable for presenting representations of objects that are associated with an action.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 5A-5L are diagrams of an example user interface for generating intermediary emergent content in accordance with some implementations.

Figure 1:
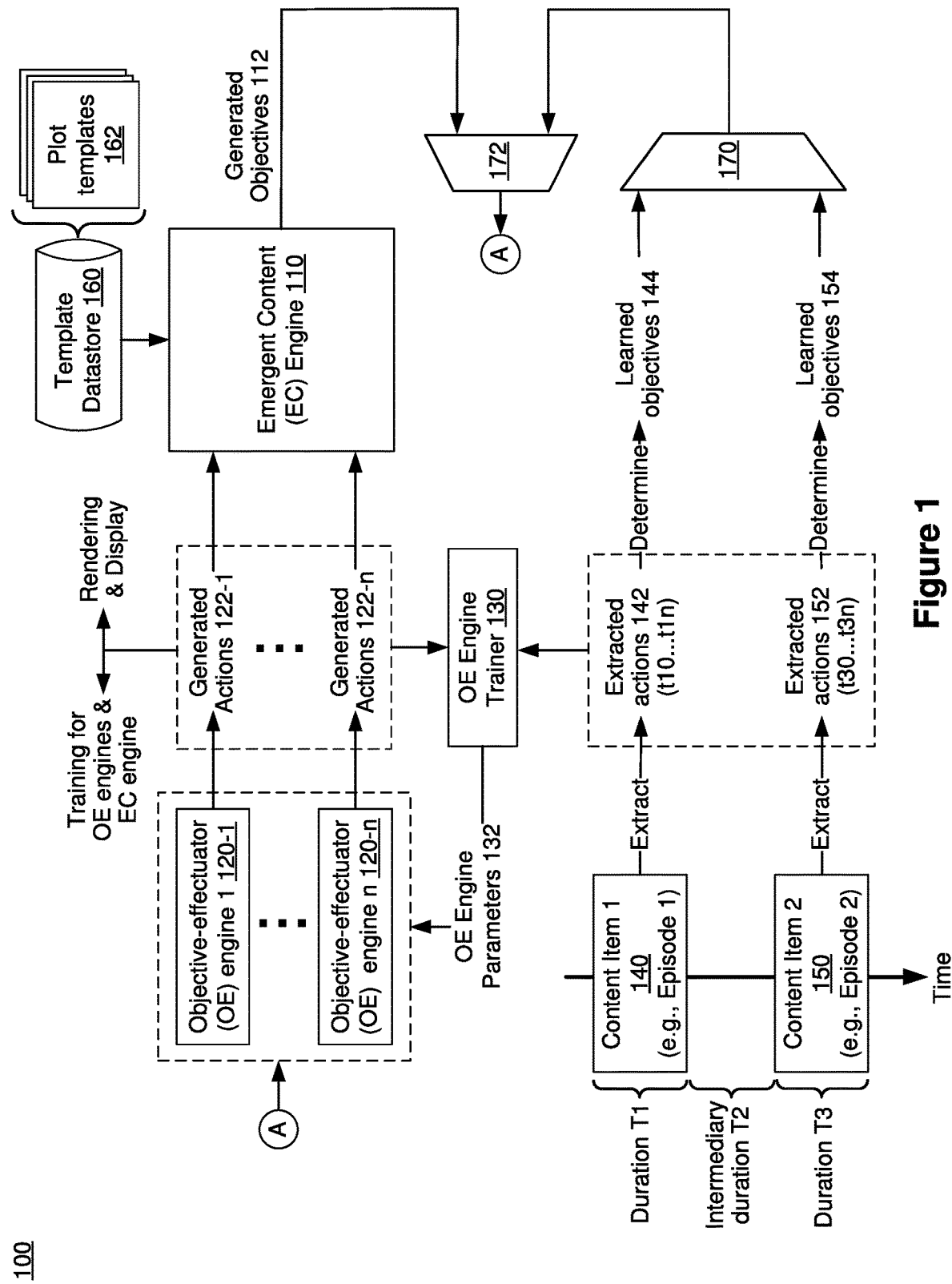
FIG. 1 is a block diagram of an example system for generating intermediary emergent content items in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for synthesizing intermediary emergent content. In various implementations, a device includes a non-transitory memory and one or more processors coupled with the non-transitory memory. In some implementations, a method includes obtaining an end state of a first content item spanning a first time duration. In some implementations, the end state of the first content item indicates a first state of an SR agent at the end of the first time duration. In some implementations, the method includes obtaining an initial state of a second content item spanning a second time duration subsequent the first time duration. In some implementations, the initial state of the second content item indicates a second state of the SR agent at the beginning of the second time duration. In some implementations, the method includes synthesizing an intermediary emergent content item spanning over an intermediary time duration that is between the end of the first time duration and the beginning of the second time duration. In some implementations, synthesizing the intermediary emergent content item includes generating a set of bounded objectives for the SR agent by providing the end state of the first content item and the initial state of the second content item to an emergent content engine. In some implementations, the set of bounded objectives are bounded by the end state of the first content item and the initial state of the second content item. In some implementations, synthesizing the intermediary emergent content item includes generating a set of actions for the SR agent by providing the set of bounded objectives to an SR agent engine. In some implementations, the first action in the set of actions matches an action of the SR agent at the end of the first time duration and the last action in the set of actions matches an action of the SR agent at the beginning of the second time duration. In some implementations, synthesizing the intermediary emergent content item includes rendering the intermediary content item for display.

Various implementations disclosed herein include devices, systems, and methods for training an SR agent engine. In various implementations, a device includes a non-transitory memory and one or more processors coupled with the non-transitory memory. In some implementations, a method includes extracting, from a content item, a set of actions performed by an action-performing element in the content item. In some implementations, the method includes determining, by semantic analysis, a set of objectives for an SR agent based on the set of actions. In some implementations, an SR representation of the SR agent corresponds to the action-performing element. In some implementations, the method includes training, based on the set of objectives, an SR agent engine that generates actions for the SR agent. In some implementations, the training is complete when actions generated by the SR agent engine are within an acceptability threshold of the set of actions extracted from the content item.

Various implementations disclosed herein include devices, systems, and methods for synthesizing intermediary emergent content. In various implementations, a device includes a non-transitory memory and one or more processors coupled with the non-transitory memory. In some implementations, a method includes displaying, on the display, a user interface that includes a first representation of a first content item spanning a first time duration and a second representation of a second content item spanning a second time duration. In some implementations, the method includes obtaining, via the input device, a user input corresponding to a request to generate an intermediary emergent content item spanning over an intermediary time duration that is between the end of the first time duration and the beginning of the second time duration. In some implementations, the method includes in response to obtaining the user input, displaying, on the display, a representation of the intermediary emergent content item between the first representation of the first content item and the second representation of the second content item. In some implementations, the intermediary emergent content item is synthesized after the user input is obtained.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

The present disclosure provides methods, systems, and/or devices for generating intermediary emergent content. The intermediary emergent content spans over an intermediary time duration that is between a first time duration that corresponds to a first content item and a second time duration that corresponds to a second content item. An emergent content engine synthesizes the intermediary emergent content based on an end state of the first content item and an initial state of the second content item. The intermediary emergent content allows a user to view how a plot progresses between the first content item and the second content item.

A physical setting refers to a world that individuals can sense and/or with which individuals can interact without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste.

In contrast, a synthesized reality (SR) setting refers to an entirely or partly computer-created setting that individuals can sense and/or with which individuals can interact via an electronic system. In SR, a subset of an individual's movements is monitored, and, responsive thereto, one or more attributes of one or more virtual objects in the SR setting is changed in a manner that conforms with one or more physical laws. For example, a SR system may detect an individual walking a few paces forward and, responsive thereto, adjust graphics and audio presented to the individual in a manner similar to how such scenery and sounds would change in a physical setting. Modifications to attribute(s) of virtual object(s) in a SR setting also may be made responsive to representations of movement (e.g., audio instructions).

An individual may interact with and/or sense a SR object using any one of his senses, including touch, smell, sight, taste, and sound. For example, an individual may interact with and/or sense aural objects that create a multi-dimensional (e.g., three dimensional) or spatial aural setting, and/or enable aural transparency. Multi-dimensional or spatial aural settings provide an individual with a perception of discrete aural sources in multi-dimensional space. Aural transparency selectively incorporates sounds from the physical setting, either with or without computer-created audio. In some SR settings, an individual may interact with and/or sense only aural objects.

One example of SR is virtual reality (VR). A VR setting refers to a simulated setting that is designed only to include computer-created sensory inputs for at least one of the senses. A VR setting includes multiple virtual objects with which an individual may interact and/or sense. An individual may interact and/or sense virtual objects in the VR setting through a simulation of a subset of the individual's actions within the computer-created setting, and/or through a simulation of the individual or his presence within the computer-created setting.

Another example of SR is mixed reality (MR). A MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation and/or location with respect to the physical setting to enable interaction between virtual objects and real objects (which are physical elements from the physical setting or representations thereof). For example, a system may monitor movements so that a virtual plant appears stationery with respect to a physical building.

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a hologram, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical element captured by imaging sensor(s). In another example, a virtual object may exhibit characteristics consistent with actual weather conditions in the physical setting, as identified via imaging, weather-related sensors, and/or online weather data. In yet another example, an augmented reality forest may have virtual trees and structures, but the animals may have features that are accurately reproduced from images taken of physical animals.

Many electronic systems enable an individual to interact with and/or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

FIG. 1 is a block diagram of an example system 100 that synthesizes intermediary emergent content in accordance with some implementations. In various implementations, the system 100 synthesizes intermediary emergent content that spans a time duration that is between time durations corresponding to existing content. Briefly, in various implementations, the system 100 extracts actions from existing content, analyzes the actions to learn objectives, and utilizes the extracted actions and/or the learned objectives to synthesize the intermediary emergent content. To that end, in various implementations, the system 100 includes an emergent content engine 110, objective-effectuator engines 120-1, . . . , 120-n, an objective-effectuator engine trainer 130, and a plot template datastore 160.

In various implementations, an objective-effectuator represents a behavioral model of an action-performing element. In some implementations, an objective-effectuator models the behavior of an action-performing element. In some implementations, an objective-effectuator performs actions that are within a degree of similarity to actions that the action-performing element performs. In some implementations, an objective-effectuator models a character from fictional material such as a movie, a video game, a comic, and/or a novel. In some implementations, an objective-effectuator models an equipment (e.g., machinery such as a plane, a tank, a robot, a car, etc.). In some implementations, an objective-effectuator models a tangible object from fictional material or from the real-world (e.g., from a physical setting). In various implementations, an objective-effectuator is referred to as an SR agent, the objective-effectuator engines 120-1, . . . , 120-n are referred to as SR agent engines, and the objective-effectuator engine trainer 130 is referred to as an SR agent engine trainer.

In various implementations, an objective-effectuator effectuates an action in order to advance (e.g., complete or satisfy) an objective. In some implementations, an objective-effectuator is associated with a particular objective, and the objective-effectuator effectuates actions that improve the likelihood of advancing that particular objective. Referring to FIG. 1, the objective-effectuator engines 120-1, . . . , 120-n generate actions 122-1, . . . , 122-n for corresponding objective-effectuators. In some implementations, the emergent content engine 110 provides objectives 112 to the objective-effectuator engines 120-1, . . . , 120-n. The objective-effectuator engines 120-1, . . . , 120-n utilize the objectives 112 to generate the actions 122-1, . . . , 122-n.

In various implementations, the objective-effectuator engine trainer 130 ("trainer 130", hereinafter for the sake of brevity) trains the objective-effectuator engines 120-1, ..., 120-*n*. In the example of FIG. 1, the trainer 130 trains the objective-effectuator engines 120-1, ..., 120-*n* based on a first content item 140 and a second content item 150. As illustrated in FIG. 1, the first content item 140 spans a first time duration T1, and the second content item 150 spans a second time duration T3. FIG. 1 illustrates an intermediary duration T2 between the first time duration T1 and the second time duration T3. There is no existing content that spans the intermediary duration T2. After the trainer 130 utilizes the first content item 140 and the second content item 150 to train the objective-effectuator engines 120-1, ..., 120-*n*, the objective-effectuator engines 120-1, ..., 120-*n* generate an intermediary emergent content item that spans the intermediary duration T2.

In some implementations, the trainer 130 obtains actions that are extracted from existing content. In the example of FIG. 1, the trainer 130 obtains a first set of actions 142 that are extracted from the first content item 140, and a second set of actions 152 that are extracted from the second content item 150. In some implementations, the first set of actions 142 includes actions that action-performing elements (e.g., characters, equipment, etc.) perform in the first content item 140 to advance a plot/storyline of the first content item 140. In some implementations, the second set of actions 152 includes actions that action-performing elements perform in the second content item 150 to advance a plot/storyline of the second content item 150. In some implementations, a set of actions are extracted from a content item by performing scene analysis on the content item in order to identify the action-performing elements and the actions that the action-performing elements perform. In some implementations, the trainer 130 determines parameters 132 for the objective-effectuator engines 120-1, ..., 120-*n* based on the extracted actions. In some implementations, the parameters 132 include neural network parameters.

In some implementations, the objective-effectuator engines 120-1, ..., 120-*n* obtain objectives that are associated with existing content. In some implementations, the objectives associated with existing content are determined based on (e.g., derived from) the actions that are extracted from the existing content. In the example of FIG. 1, the objective-effectuator engines 120-1, ..., 120-*n* obtain a first set of learned objectives 144 that are determined based on the first set of actions 142. The objective-effectuator engines 120-1, ..., 120-*n* obtain a second set of learned objectives 154 that are determined based on the second set of actions 152. In some implementations, learned objectives are determined by performing semantic analysis on the extracted actions. In the example of FIG. 1, the objective-effectuator engines 120-1, ..., 120-*n* obtain the first set of learned objectives 144 and the second set of learned objectives 154 via an aggregator 170. In some implementations, the aggregator 170 aggregates (e.g., packages) the first set of learned objectives 144 and the second set of learned objectives 154. In some implementations, the aggregator 170 provides the sets of learned objectives 144 and 154 to a selector 172 that forwards the sets of learned objectives 144 and 154 to the objective-effectuator engines 120-1, ..., 120-*n* during a training phase.

During the training phase of the objective-effectuator engines 120-1, ..., 120-*n*, the objective-effectuator engines 120-1, ..., 120-*n* generate the actions 122-1, ..., 122-*n* based on learned objectives (e.g., the sets of learned objectives 144 and 154). The trainer 130 compares the generated actions 122-1, ..., 122-*n* with the extracted actions. If the generated actions 122-1, ..., 122-*n* are within a degree of similarity to the extracted actions, then the trainer 130 determines that the training of the objective-effectuator engines 120-1, ..., 120-*n* is complete. If the generated actions 122-1, ..., 122-*n* are not within a degree of similarity to the extracted actions, then the trainer 130 adjusts the parameters 132 based on a difference between the generated actions 122-1, ..., 122-*n* and the extracted actions.

During the training phase of the objective-effectuator engines 120-1, ..., 120-*n*, the objective-effectuator engines 120-1, ..., 120-*n* generate actions 122-1, ..., 122-*n* for the first time duration T1. The trainer 130 compares the actions 122-1, ..., 122-*n* generated for the first time duration T1 with the first set of extracted actions 142 ("extracted actions 142", hereinafter for the sake of brevity). In some implementations, if the actions 122-1, ..., 122-*n* generated for the first time duration T1 match (e.g., are within a degree of similarity to) the extracted actions 142, then the trainer 130 determines that the training of the objective-effectuator engines 120-1, ..., 120-*n* is complete. In some implementations, if the actions 122-1, ..., 122-*n* generated for the first time duration T1 match the extracted actions 142, then the trainer 130 determines whether the objective-effectuator engines 120-1, ..., 120-*n* are able to generate actions 122-1, ..., 122-*n* for the second time duration T3 that match the second set of extracted actions 152 ("the extracted actions 152", hereinafter for the sake of brevity). In some implementations, the trainer 130 continues adjusting the parameters 132 until the actions 122-1, ..., 122-*n* generated for the first time duration T1 match the extracted actions 142 from the first content item 140.

During the training phase of the objective-effectuator engines 120-1, ..., 120-*n*, the objective-effectuator engines 120-1, ..., 120-*n* generate actions 122-1, ..., 122-*n* for the second time duration T3. The trainer 130 compares the actions 122-1, ..., 122-*n* generated for the second time duration T3 with the extracted actions 152. In some implementations, if the actions 122-1, ..., 122-*n* generated for the second time duration T3 match (e.g., are within a degree of similarity to) the extraction actions 152, then the trainer 130 determines that the training of the objective-effectuator engines 120-1, ..., 120-*n* is complete. In some implementations, the trainer 130 continues adjusting the parameters 132 until the actions 122-1, ..., 122-*n* generated for the second time duration T3 match the extracted actions 152 from the second content item 150.

In some implementations, after determining that the training of the objective-effectuator engines 120-1, ..., 120-*n* is complete, the trainer 130 instructs the selector 172 to stop forwarding the learned objectives 144 and 154 to the objective-effectuator engines 120-1, ..., 120-*n*.

During the training phase, the objective-effectuator engines 120-1, ..., 120-*n* provide the generated actions 122-1, ..., 122-*n* to the emergent content engine 110, so that the emergent content engine 110 can utilize the actions 122-1, ..., 122-*n* as training data. During the training phase, the objective-effectuator engines 120-1, ..., 120-*n* provide the generated actions 122-1, ..., 122-*n* to themselves, so that the parameters 132 of the objective-effectuator engines 120-1, ..., 120-*n* can be adjusted based on the generated actions 122-1, ..., 122-*n*.

In the production phase, the objective-effectuator engines 120-1, ..., 120-*n* generate actions 122-1, ..., 122-*n* that collectively form an intermediary emergent content item that spans the intermediary duration T2. In some implementations, the emergent content engine 110 generates objectives 112 (e.g., a set of bounded objectives) based on an end state of the first content item 140 and an initial state of the second content item 150. The emergent content engine 110 provides the objectives 112 to the objective-effectuator engines 120-1, . . . , 120-$n$ via the selector 172. In the production phase, the selector 172 forwards the objectives 112 to the objective-effectuator engines 120-1, . . . , 120-$n$ instead of forwarding the learned objectives 144 and 154.

The objective-effectuator engines 120-1, . . . , 120-$n$ utilize the objectives 112 provided by the emergent content engine 110 to generate actions 122-1, . . . , 122-$n$ for the intermediary duration T2. The actions 122-1, . . . , 122-$n$ for the intermediary duration T2 collectively form the intermediary emergent content item that spans the intermediary duration T2. In some implementations, the objective-effectuator engines 120-1, . . . , 120-$n$ provide the actions 122-1, . . . , 122-$n$ for the intermediary duration T2 to a rendering and display pipeline, so that the intermediary emergent content item can be presented to a user.

In some implementations, the plot template datastore 160 stores various plot templates 162. In some implementations, each plot template 162 corresponds to a type of plot (e.g., a type of storyline). In some implementations, the plot templates 162 include a plot template for a mystery plot. In some implementations, the plot templates 162 include a plot template for a disaster plot. In some implementations, the plot templates 162 include a plot template for a comedy plot. In some implementations, the emergent content engine 110 selects a plot template 162 from the plot template datastore 160. In some implementations, the objectives 112 are a function of the plot template 162 that the emergent content engine 110 selects from the plot template datastore 160. In some implementations, the objectives 112 advance a plot corresponding with the plot template 162 that the emergent content engine 110 selects.

In some implementations, the emergent content engine 110 selects one of the plot templates 162 from the plot template datastore 160 based on the end state of the first content item 140 and/or the initial state of the second content item 150. In some implementations, the emergent content engine 110 selects one of the plot templates 162 based on the learned objectives 144 and/or 154. In some implementations, the learned objectives 144 and/or 154 indicate a pattern that matches one of the plot templates 162. In such implementations, the emergent content engine 110 selects the plot template 162 that most closely matches the learned objectives 144 and/or 154. In some implementations, the emergent content engine 110 selects one of the plot templates 162 based on a user input. For example, in some implementations, the user input specifies which of the plot templates 162 is to be used for the intermediary emergent content item.

Figure 2A:
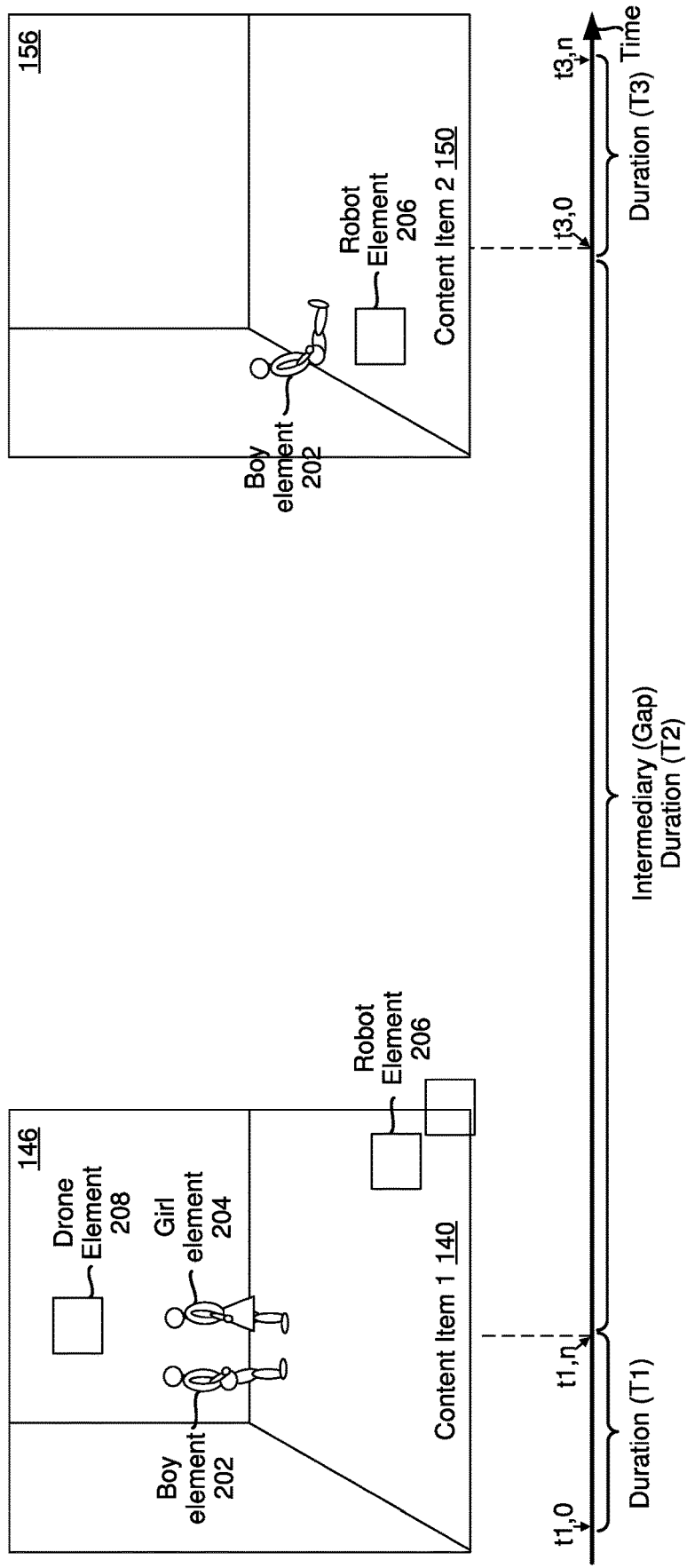
FIGS. 2A-2F are diagrams illustrating an example intermediary emergent content item in accordance with some implementations.

FIG. 2A is a diagram that illustrates an end state 146 of the first content item 140 and an initial state 156 of the second content item 150. In various implementations, the first content item 140 has various states that correspond to different times t1,0, . . . , t1,$n$ within the first time duration T1. The end state 146 of the first content item 140 corresponds to time t1,$n$. In various implementations, the second content item 150 has various states that correspond to different times t3,0, . . . , t3,$n$ within the second time duration T3. The initial state 156 of the second content item 150 corresponds to time t3,$n$.

In some implementations, the end state 146 of the first content item 140 indicates how the first content item 140 ends. In some implementations, the end state 146 of the first content item 140 indicates various action-performing elements that are present at time t1,$n$. In some implementations, the end state 146 of the first content item 140 indicates locations of the action-performing elements, actions that the action-performing elements are performing at time t1,$n$, a geographical location where the last scene of the first content item 140 takes place, and/or environmental conditions within the last scene of the first content item 140. In the example of FIG. 2A, the end state 146 of the first content item 140 includes a boy action-performing element 202, a girl action-performing element 204, a robot action-performing element 206, and a drone action-performing element 208.

In some implementations, the initial state 156 of the second content item 150 indicates how the second content item 150 starts. In some implementations, the initial state 156 of the second content item 150 indicates various action-performing elements that are present at time t3,0. In some implementations, the initial state 156 of the second content item 150 indicates locations of the action-performing elements, actions that the action-performing elements are performing at time t3,0, a geographical location where the first scene of the second content item 150 takes place, and/or environmental conditions within the first scene of the second content item 150. In the example of FIG. 2A, the initial state 156 of the second content item 150 includes the boy action-performing element 202 and the robot action-performing element 206.

Figure 2B:
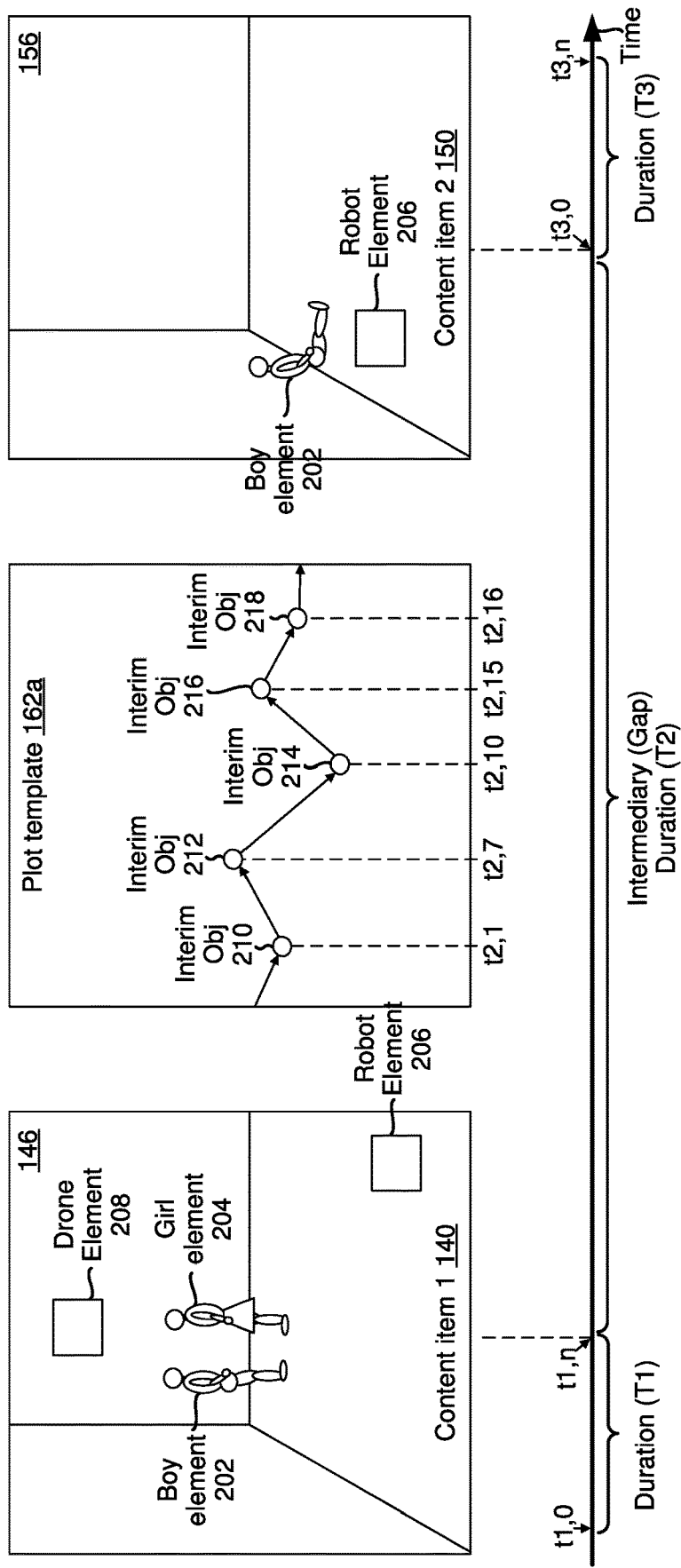

FIG. 2B illustrates a plot template 162$a$ that is selected from the plot templates 162 shown in FIG. 1. In the example of FIG. 2B, the plot template 162$a$ includes a first interim objective 210 at time t2,1, a second interim objective 212 at time t2,7, a third interim objective 214 at time t2,10, a fourth interim objective 216 at time t2,15, and a fifth interim objective 218 at time t2,16. The plot template 162$a$ indicates a relationship between the various interim objectives 210-218. The relationship between the interim objectives 210-218 indicates the plot for the intermediary emergent content item that spans the intermediary duration T2. For example, the relationship between the interim objectives 210-218 indicates whether the plot is a mystery plot, a disaster plot, a suspense plot, a comedy plot, etc.

Figure 2C:
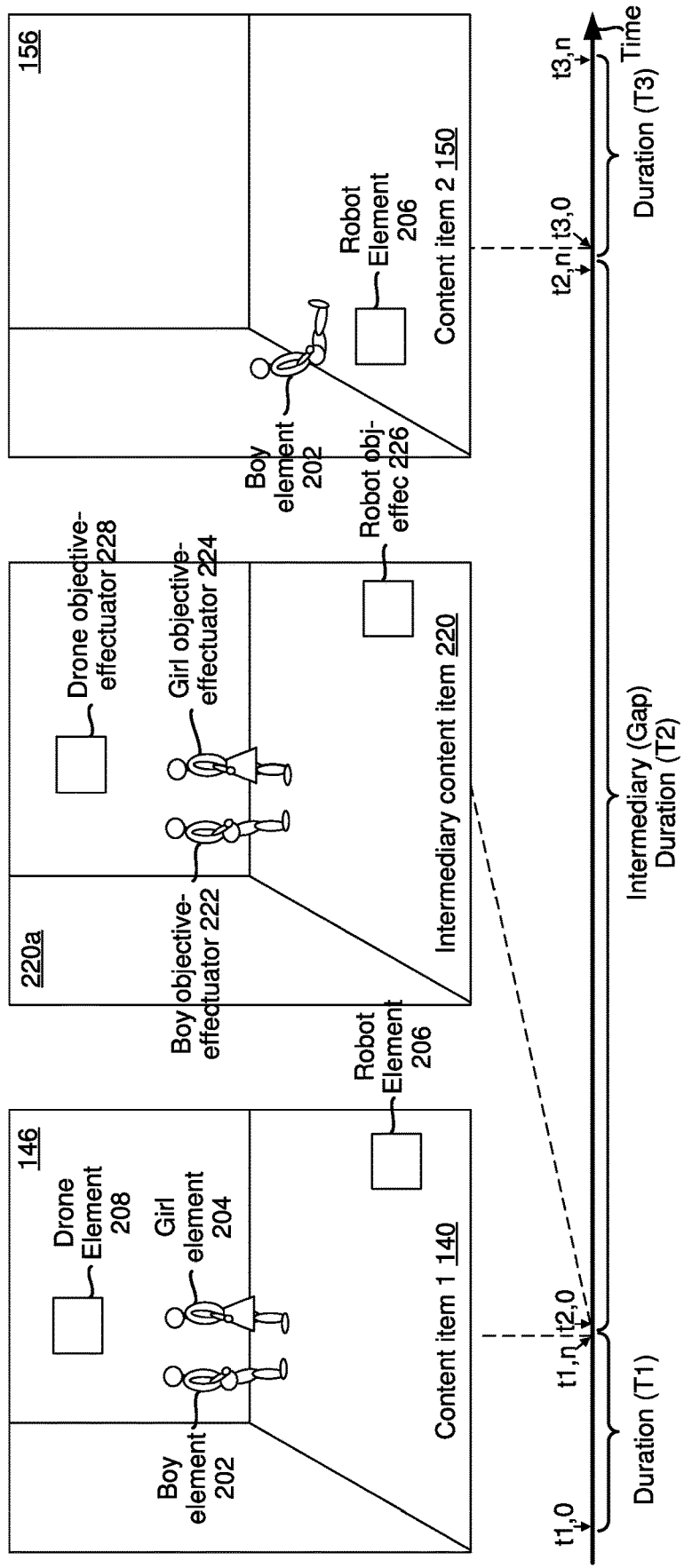

FIG. 2C illustrates an example intermediary emergent content item 220 at its initial state 220$a$ (at time t2,0). The intermediary emergent content item 220 includes an SR representation of a boy objective-effectuator 222 ("boy objective-effectuator 222", hereinafter for the sake of brevity), an SR representation of a girl objective-effectuator 224 ("girl objective-effectuator 224", hereinafter for the sake of brevity), an SR representation of a robot objective-effectuator 226 ("robot objective-effectuator 226", hereinafter for the sake of brevity), and an SR representation of a drone objective-effectuator 228 ("drone objective-effectuator 228", hereinafter for the sake of brevity). In the example of FIG. 2C, the boy objective-effectuator 222 models the behavior of the boy action-performing element 202. The girl objective-effectuator 224 models the behavior of the girl action-performing element 204. The robot objective-effectuator 226 models the behavior of the robot action-performing element 206. The drone objective-effectuator 228 models the behavior of the drone action-performing element 208.

As illustrated in FIG. 2C, in some implementations, the initial state 220$a$ of the intermediary emergent content item 220 matches (e.g., is identical to) the end state 146 of the first content item 140. As such, in some implementations, the state of the intermediary emergent content item 220 at time t2,0 is a replica of the end state 146 of the first content item 140. To that end, the position and actions of the boy objective-effectuator 222 at time t2,0 are the same as the position and actions of the boy action-performing 202 at time t1,n. The position and actions of the girl objective-effectuator 224 at time t2,0 are the same as the position and actions of the girl action-performing element 204 at time t1,n. The position and actions of the robot objective-effectuator 226 at time t2,0 are the same as the position and actions of the robot action-performing element 206 at time t1,n. The position and actions of the drone objective-effectuator 228 at time t2,0 are the same as the position and actions of the drone action-performing element 208 at time t1,n.

Figure 2D:
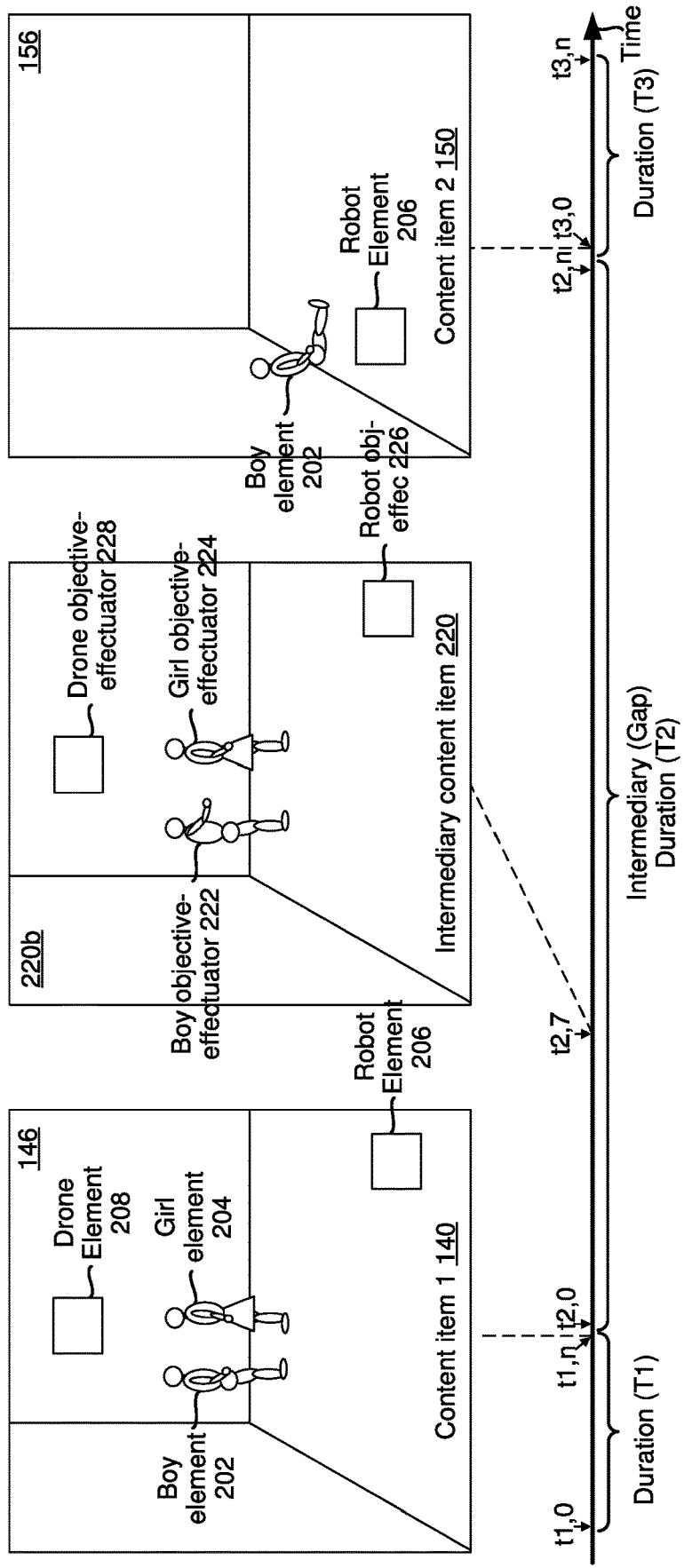
Figure 2E:
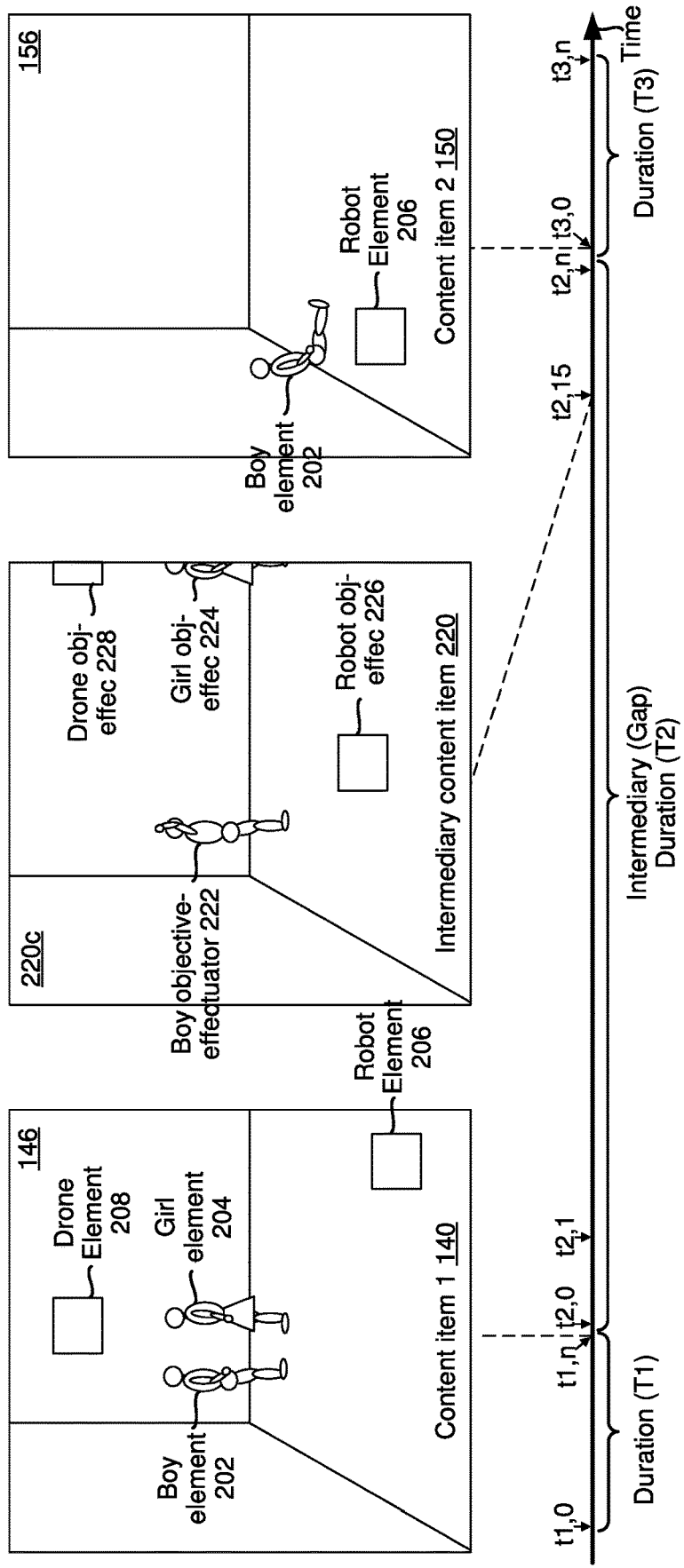

FIGS. 2D and 2E illustrate intermediate states 220b and 220c, respectively, of the intermediary emergent content item 220. As illustrated in FIG. 2D, the intermediate state 220b of the intermediary emergent content item 220 corresponds to time t2,7. In the intermediate state 220b, the boy objective-effectuator 222 and the girl objective-effectuator 224 are performing actions that are different from the actions that the boy objective-effectuator 222 and the girl objective-effectuator 224 performed at the initial state 220a of the intermediary emergent content item 220. For example, as illustrated in FIG. 2D, the girl objective-effectuator 224 has turned around and the boy objective-effectuator 222 has raised its arm.

As illustrated in FIG. 2E, the intermediate state 220c of the intermediary emergent content item 220 corresponds to time t2,15. In the intermediate state 220c, the boy objective-effectuator 222 and the girl objective-effectuator 224 are performing actions that are different from the actions that the boy objective-effectuator 222 and the girl objective-effectuator 224 performed at the initial state 220a and the intermediate state 220b of the intermediary emergent content item 220. For example, as illustrated in FIG. 2E, the girl objective-effectuator 224 and the drone objective-effectuator 228 are about to exit from the scene, and the robot objective-effectuator 226 is moving towards the boy objective-effectuator 222.

Figure 2F:
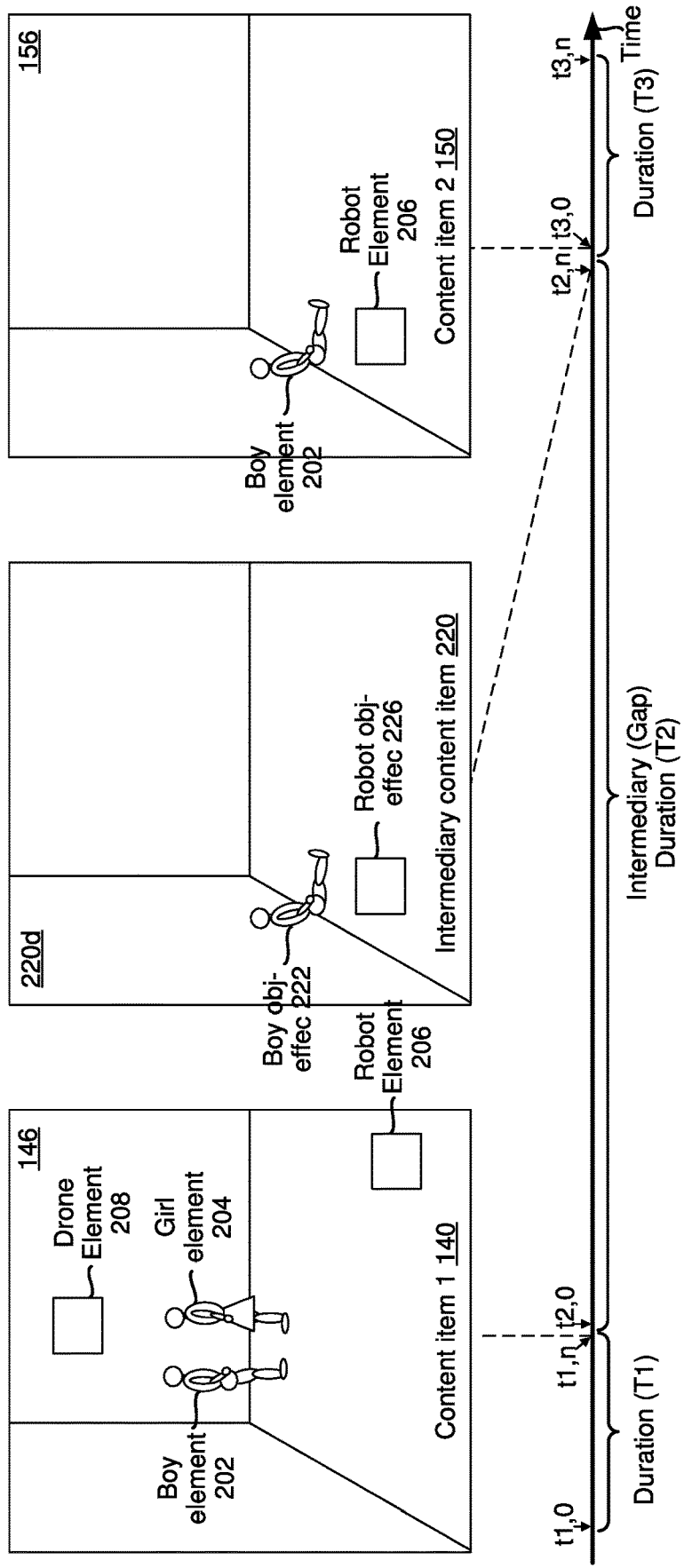

FIG. 2F illustrates an end state 220d of the intermediary emergent content item 220 at time t2,n. As illustrated in FIG. 2F, in some implementations, the end state 220d of the intermediary emergent content item 220 matches (e.g., is identical to) the initial state 156 of the second content item 150. As such, in some implementations, the state of the intermediary emergent content item 220 at time t2,n is a replica of the initial state 156 of the second content item 150. To that end, the position and actions of the boy objective-effectuator 222 at time t2,n are the same as the position and actions of the boy action-performing element 202 at time t3,0. The position and actions of the robot objective-effectuator 226 at time t2,n are the same as the position and actions of the robot action-performing element 206 at time t3,n.

Figure 3A:
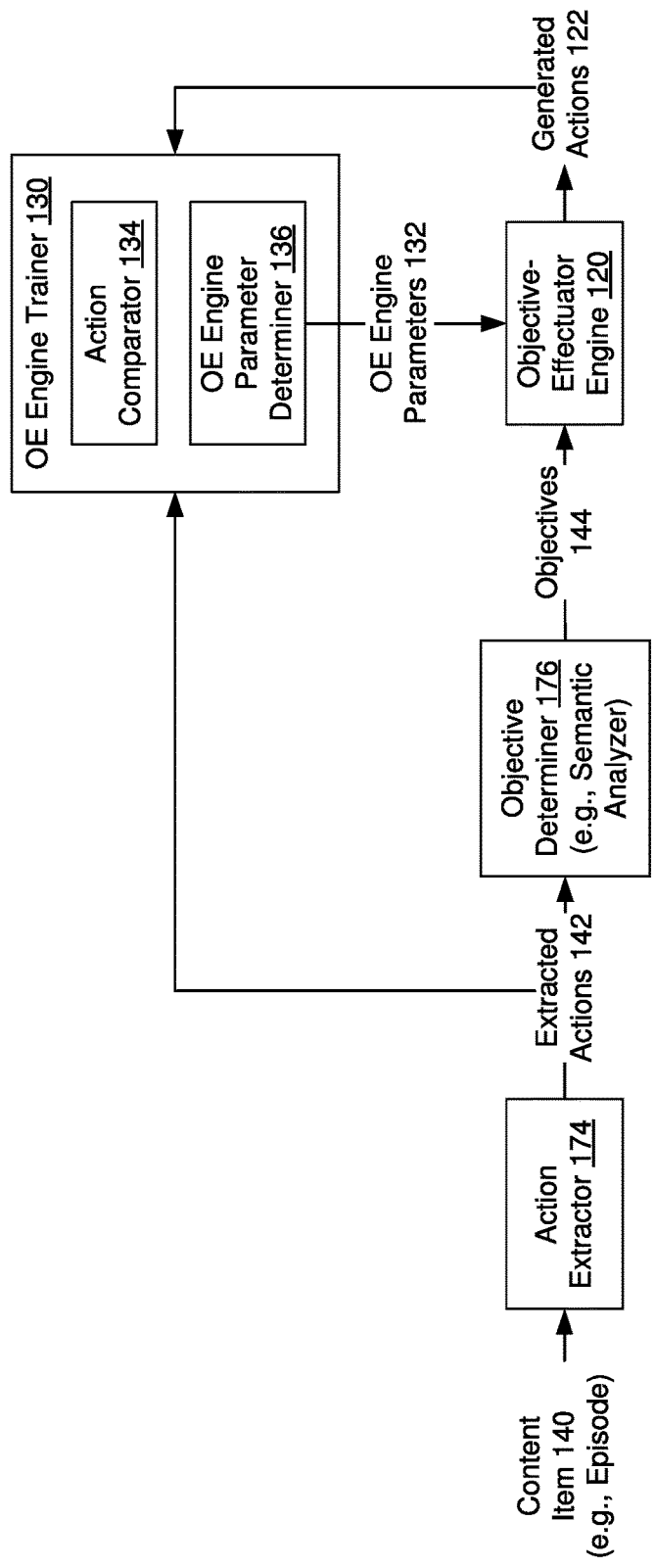
FIG. 3A is a block diagram of an example system for training an objective-effectuator engine in accordance with some implementations.

FIG. 3A illustrates an example system 100a for training an objective-effectuator engine 120. In some implementations, the system 100a includes the objective-effectuator engine 120, the trainer 130, an action extractor 174 and an objective determiner 176.

In some implementations, the action extractor 174 obtains the first content item 140, and extracts actions 142 from the first content item 140. In some implementations, the action extractor 174 performs scene analysis to identify the extracted actions 142 that are being performed in the first content item 140. Although FIG. 3A shows a single content item, in some implementations, the action extractor 174 obtains multiple content items (e.g., a series of content items, for example, an entire season with numerous episodes). In some implementations, the action extractor 174 provides the extracted actions 142 to the trainer 130 and/or the objective determiner 176.

In some implementations, the objective determiner 176 determines the first set of objectives 144 based on the extracted actions 142. In some implementations, the objective determiner 176 derives the first set of objectives 144 from the extracted actions 142. In some implementations, the objective determiner 176 learns the first set of objectives 144 by analyzing the extracted actions 142. As such, in some implementations, the first set of objectives 144 are referred to as learned objectives or derived objectives. In some implementations, the objective determiner 176 includes a semantic analyzer that performs semantic analysis on the extracted actions 142 to determine the first set of objectives 144. For example, in some implementations, the objective determiner 176 performs semantic analysis on text that corresponds to dialogs that are spoken by the action-performing elements in the first content item 140.

In some implementations, the objective determiner 176 provides the first set of objectives 144 to the objective-effectuator engine 120. In some implementations, the objective-effectuator engine 120 generates actions 122 based on the first set of objectives 144. For example, in some implementations, the objective-effectuator engine 120 generates actions 122 that advance (e.g., complete or satisfy) the first set of objectives 144. In some implementations, at least during the training phase, the objective-effectuator engine 120 provides the generated actions 122 to the trainer 130.

In some implementations, the trainer 130 includes an action comparator 134 and an objective-effectuator engine parameter determiner 136 ("parameter determiner 136", hereinafter for the sake of brevity). In some implementations, the parameter determiner 136 determines the parameters 132 based on the extracted actions 142. In some implementations, the action comparator 134 compares the generated actions 122 with the extracted actions 142. If the action comparator 134 determines that the generated actions 122 match the extracted actions 142, then the trainer 130 determines that the training of the objective-effectuator engine 120 is complete. If the action comparator 134 determines that the generated actions 122 do not match the extracted actions 142, then the parameter determiner 136 adjusts the parameters 132. In some implementations, the parameter determiner 136 adjusts the parameters 132 based on a difference between the generated actions 122 and the extracted actions 142. In some implementations, the adjustment to the parameters 132 is a function of (e.g., directly proportional to) the difference between the generated actions 122 and the extracted actions 142.

Figure 3B:
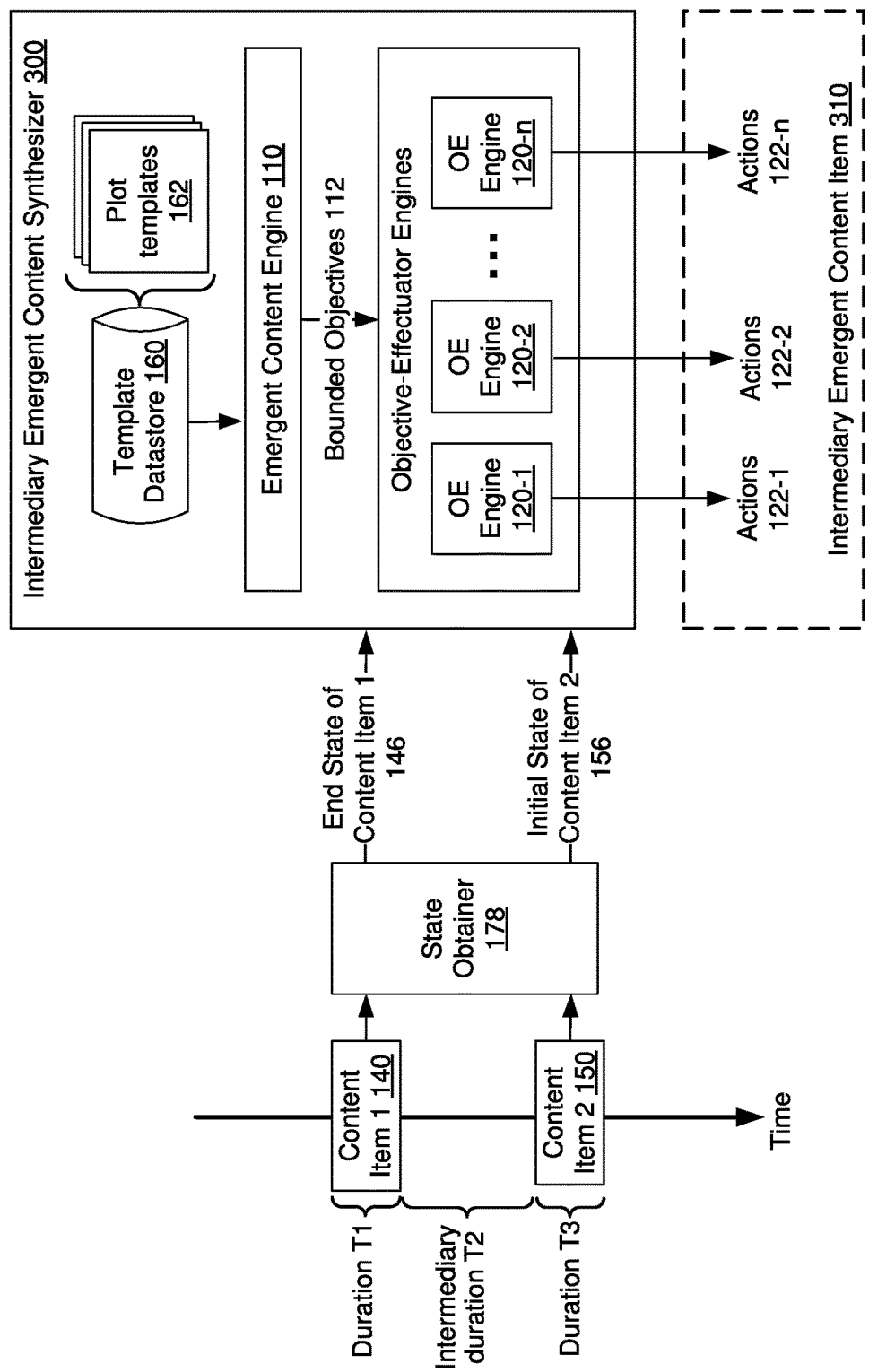
FIG. 3B is a block diagram of a system for generating an intermediary emergent content item in accordance with some implementations.

FIG. 3B illustrates an example system 100b for synthesizing intermediary emergent content items. In some implementations, the system 100b includes a state obtainer 178 and an intermediary emergent content synthesizer 300. In the example of FIG. 3B, the intermediary emergent content synthesizer 300 includes the emergent content engine 110, the objective-effectuator engines 120-1, . . . , 120-n, and the plot template datastore 160.

In some implementations, the state obtainer 178 obtains the end state 146 of the first content item 140 and the initial state 156 of the second content item 150. In some implementations, the state obtainer 178 obtains the first content item 140. In such implementations, the state obtainer 178 analyzes the first content item 140 to determine the end state 146 of the first content item 140. For example, in some implementations, the state obtainer 178 performs scene analysis on the first content item 140 to identify the action-performing elements that are in the first content item 140, and the locations and actions of the action-performing elements at the end of the first content item. In some implementations, the state obtainer 178 provides the end state 146 of the first content item 140 to the intermediary emergent content synthesizer 300.

In some implementations, the state obtainer 178 obtains the second content item 150. In such implementations, the state obtainer 178 analyzes the second content item 150 to determine the initial state 156 of the second content item 150. For example, in some implementations, the state obtainer 178 performs scene analysis on the second content item 150 to identify the action-performing elements that are in the second content item 150, and the locations and actions of the action-performing elements at the beginning of the second content item. In some implementations, the state obtainer 178 provides the initial state 156 of the second content item 150 to the intermediary emergent content synthesizer 300.

In some implementations, the intermediary emergent content synthesizer 300 utilizes the end state 146 of the first content item 140 and the initial state 156 of the second content item 150 to synthesize an intermediary emergent content item 310. The intermediary emergent content item 310 spans the intermediary duration T2 that is between the first time duration T1 corresponding to the first content item 140 and the second time duration T2 corresponding to the second content item 150.

In some implementations, the emergent content engine 110 determines a set of bounded objectives (e.g., the objectives 112) based on the end state 146 of the first content item 140 and the initial state 156 of the second content item 150. In some implementations, the emergent content engine 110 selects a plot template 162 from the plot template datastore 160. In such implementations, the objectives 112 are a function of the selected plot template 162. In some implementations, the objectives 112 are bounded by a first set of objectives (e.g., the first set of objectives 144 shown in FIG. 1) associated with the end state 146 of the first content item 140 and a second set of objectives (e.g., the second set of objectives 154 shown in FIG. 1) associated with the initial state 156 of the second content item 150.

In some implementations, the objective-effectuator engines 120-1, . . . , 120-n obtain the objectives 112 from the emergent content engine 1120. The objective-effectuator engines 120-1, . . . , 120-n generate respective actions 122-1, . . . , 122-n based on the objectives 112. In some implementations, the actions 122-1, . . . , 122-n collectively form the intermediary emergent content item 310.

Figure 4A:
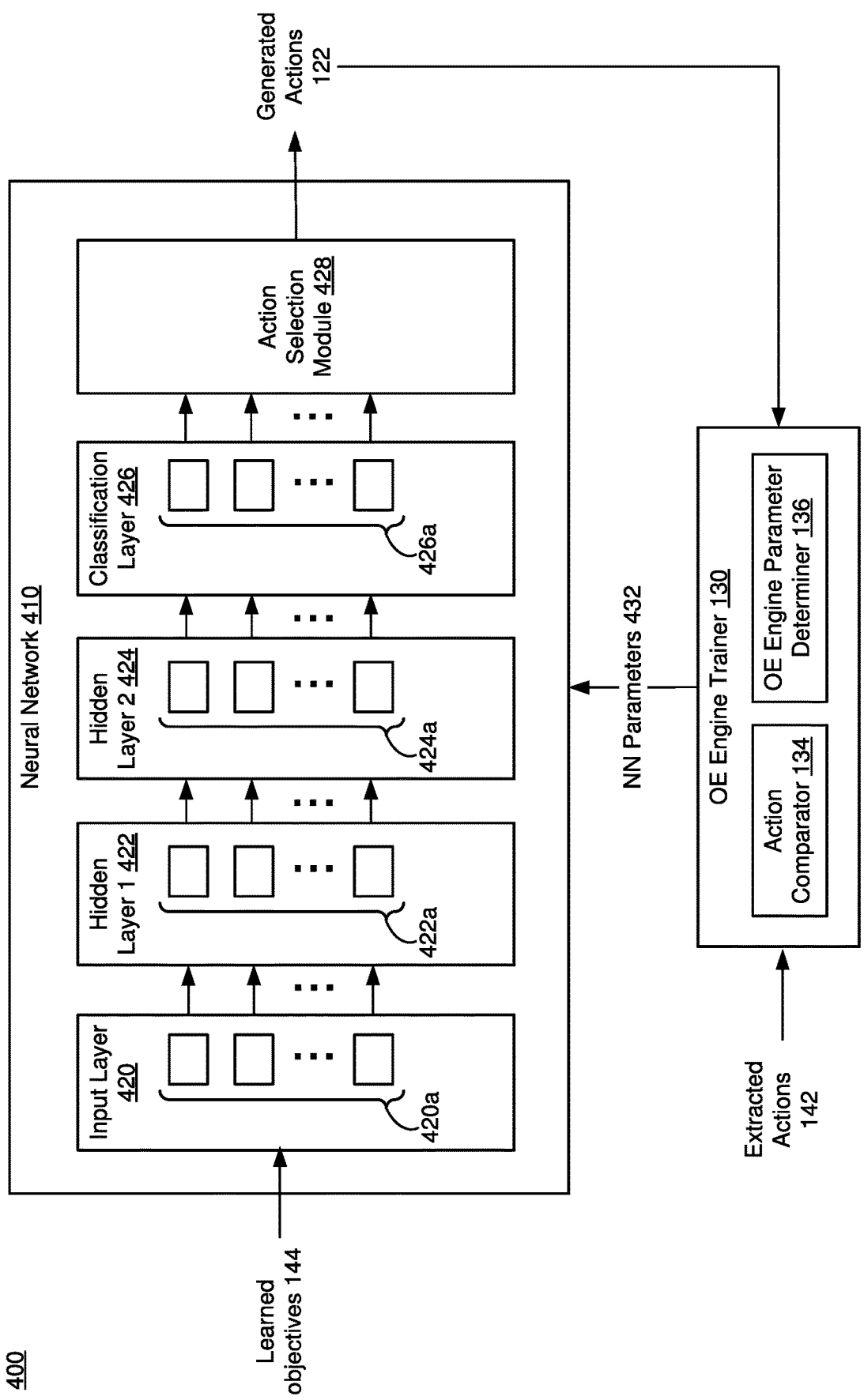
FIG. 4A is a block diagram of an example neural network being trained to generate intermediary emergent content in accordance with some implementations.

FIG. 4A is a block diagram of a system 400 in accordance with some implementations. In some implementations, the system 400 includes a neural network system 410 ("neural network 410", hereinafter for the sake of brevity) and the trainer 130. In some implementations, the neural network 410 implements an objective-effectuator engine (e.g., the objective-effectuator engine 120 shown in FIG. 3A). In some implementations, the trainer 130 provides neural network parameters 432 (e.g., neural network weights, for example, the parameters 132 shown in FIG. 3A) to the neural network 410.

In some implementations, the neural network 410 includes a long short-term memory (LSTM) recurrent neural network (RNN). In the example of FIG. 4A, the neural network 410 includes an input layer 420, a first hidden layer 422, a second hidden layer 424, a classification layer 426, and an action selection module 428. While the neural network 410 includes two hidden layers as an example, those of ordinary skill in the art will appreciate from the present disclosure that one or more additional hidden layers are also present in various implementations. Adding additional hidden layers adds to the computational complexity and memory demands, but may improve performance for some applications.

In various implementations, the input layer 420 receives various inputs. In some implementations, the input layer 420 obtains (e.g., receives) a set of objectives that are derived from a set of extracted actions. In the example of FIG. 4A, the input layer 420 receives the first set of learned objectives 144 that were derived from the extracted actions 142 of the first content item 140 shown in FIG. 3A. In some implementations, the neural network 410 includes a feature extraction module (not shown) that generates a feature stream (e.g., a feature vector) based on the first set of learned objectives 144. In such implementations, the feature extraction module provides the feature stream to the input layer 420. As such, in some implementations, the input layer 420 receives a feature stream that is a function of the learned objectives 144. In various implementations, the input layer 420 includes a number of LSTM logic units 420a, which are also referred to as neurons or models of neurons by those of ordinary skill in the art. In some such implementations, an input matrix from the features to the LSTM logic units 420a includes rectangular matrices. The size of this matrix is a function of the number of features included in the feature stream.

In some implementations, the first hidden layer 422 includes a number of LSTM logic units 422a. In some implementations, the number of LSTM logic units 422a ranges between approximately 10-500. Those of ordinary skill in the art will appreciate that, in such implementations, the number of LSTM logic units per layer is orders of magnitude smaller than previously known approaches (being of the order of $O(10^1)$-$O(10^2)$), which allows such implementations to be embedded in highly resource-constrained devices. As illustrated in the example of FIG. 4A, the first hidden layer 422 receives its inputs from the input layer 420.

In some implementations, the second hidden layer 424 includes a number of LSTM logic units 424a. In some implementations, the number of LSTM logic units 424a is the same as or similar to the number of LSTM logic units 420a in the input layer 420 or the number of LSTM logic units 422a in the first hidden layer 422. As illustrated in the example of FIG. 4A, the second hidden layer 424 receives its inputs from the first hidden layer 422. Additionally or alternatively, in some implementations, the second hidden layer 424 receives its inputs from the input layer 420.

In some implementations, the classification layer 426 includes a number of LSTM logic units 426a. In some implementations, the number of LSTM logic units 426a is the same as or similar to the number of LSTM logic units 420a in the input layer 420, the number of LSTM logic units 422a in the first hidden layer 422 or the number of LSTM logic units 424a in the second hidden layer 424. In some implementations, the classification layer 426 includes an implementation of a multinomial logistic function (e.g., a soft-max function) that produces a number of outputs that is approximately equal to a number of possible actions. In some implementations, each output includes a probability or a confidence measure of the corresponding action matching the extracted actions 142.

In some implementations, the action selection module 428 generates the actions 122 by selecting the top N action candidates provided by the classification layer 426. In some implementations, the top N action candidates are likely to match the extracted actions 142. In some implementations, the action selection module 428 provides the generated actions 122 to the trainer 130, so that the trainer 130 can compare the generated actions 122 with the extracted actions 142.

In some implementations, the trainer 130 (e.g., the action comparator 134) compares the generated actions 122 with the extracted actions 142. If the generated actions 122 match the extracted actions 142, then the trainer 130 determines that the neural network 410 has been trained. If the generated actions 122 do not match the extracted actions 142, then the trainer 130 (e.g., the parameter determiner 136) adjusts the neural network parameters 432. In some implementations, the trainer 130 (e.g., the parameter determiner 136) iteratively adjusts the neural network parameters 432 until the generated actions 122 match the extracted actions 142. In some implementations, the generated actions 122 match the extracted actions 142 if the generated actions 122 are within a degree of similarity to the extracted actions 142.

In some implementations, the neural network 410 is trained using a single content item (e.g., the first content item 140 shown in FIG. 3A). In some implementations, the neural network 410 is trained using multiple content items (e.g., the first content item 140 and the second content item 150 shown in FIG. 3B). In some implementations, the neural network 410 is trained using a series of content items (e.g., an entire season of a show with numerous episodes). In some implementations, the neural network 410 is trained using multiple series of content items (e.g., multiple seasons of a show, where each season has numerous episodes).

Figure 4B:
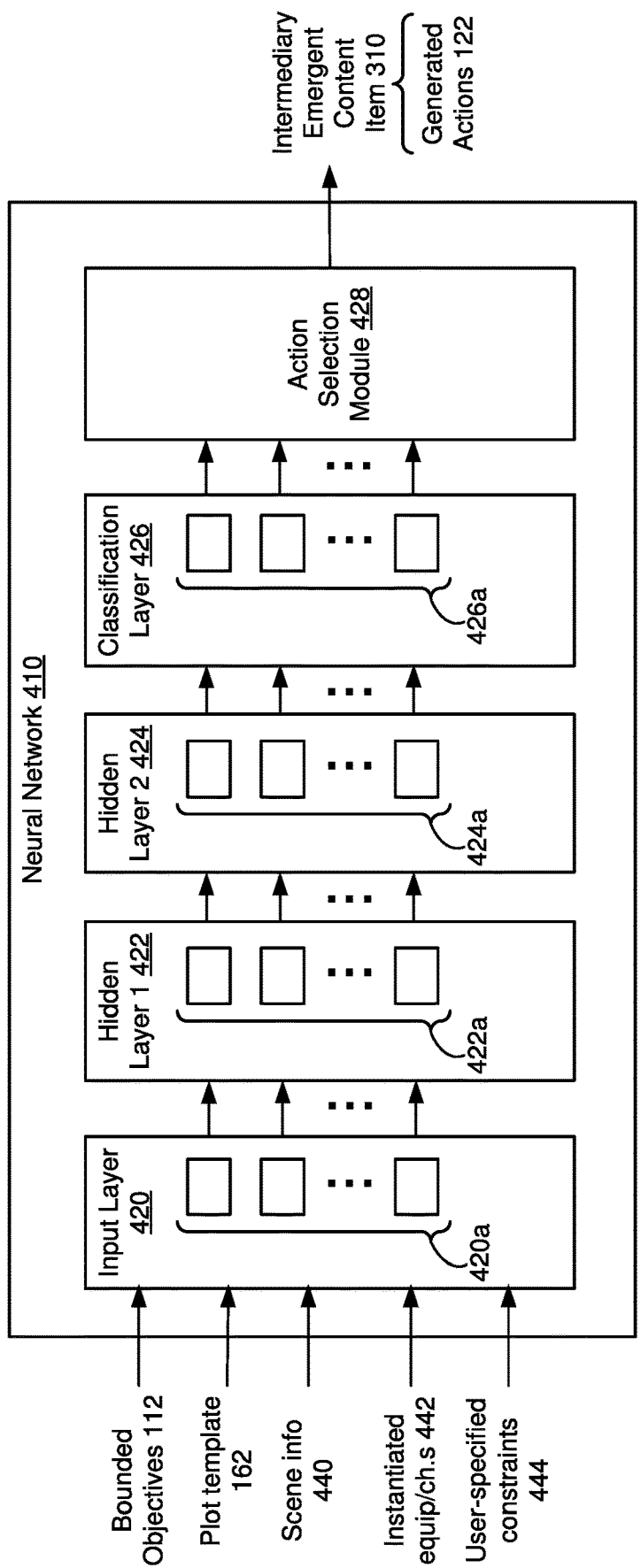
FIG. 4B is a block diagram of an example neural network that generated intermediary emergent content in accordance with some implementations.

Referring to FIG. 4B, the neural network 410 generates the intermediary emergent content item 310 based on one or more inputs. In some implementations, the neural network 410 generates the intermediary emergent content item 310 based on a set of bounded objectives (e.g., based on the set of bounded objectives 112 shown in FIG. 3B). As discussed herein, in some implementations, the bounded objectives are derived from an end state of a first content item and an initial state of a second content item. For example, as shown in FIG. 3B, the objectives 112 are derived from the end state 146 of the first content item 140 and the initial state 156 of the second content item 150.

In some implementations, the neural network 410 utilizes a plot template 162 to generate the intermediary emergent content item 310. In some implementations, the actions 122 generated by the neural network 410 are a function of the plot template 162a. For example, if the plot template 162a is a comedy plot template, then the actions 122 generated by the neural network 410 satisfy the comedy plot template.

In some implementations, the neural network 410 utilizes scene information 440 (e.g., environmental information regarding an SR setting) to generate the intermediary emergent content item 310. In some implementations, the scene information 440 indicates a boundary for the scene (e.g., a boundary for the SR setting). In such implementations, the actions 122 that form the intermediary emergent content item 310 are performed within the boundary of the scene. In some implementations, the scene information 440 indicates environmental information regarding the scene. In such implementations, the actions 122 that form the intermediary emergent content item 310 are generated based on the environment of the scene.

In some implementations, the neural network 410 utilizes information regarding instantiated equipment/characters 442 to generate the intermediary emergent content item 310. For example, in some implementations, the actions 122 that form the intermediary emergent content item 310 include interacting with the instantiated equipment/characters 442.

In some implementations, the neural network 410 utilizes user-specified constraints 444 to generate the intermediary emergent content item 310. In some implementations, the actions 122 that form the intermediary emergent content item 310 satisfy the user-specified constraints 444. For example, in some implementations, the user-specified constraints 444 specify a location where the intermediary emergent content item 310 is to take place. In such implementations, the actions 122 that form the intermediary emergent content item 310 take place at the location specified in the user-specified constraints 444. In some implementations, the user-specified constraints 444 specify specific equipment/characters that are to be included in the intermediary emergent content item 310. In such implementations, the actions 122 that form the intermediary emergent content item 310 are associated with the equipment/characters indicated in the user-specified constraints 444.

Figure 5A:
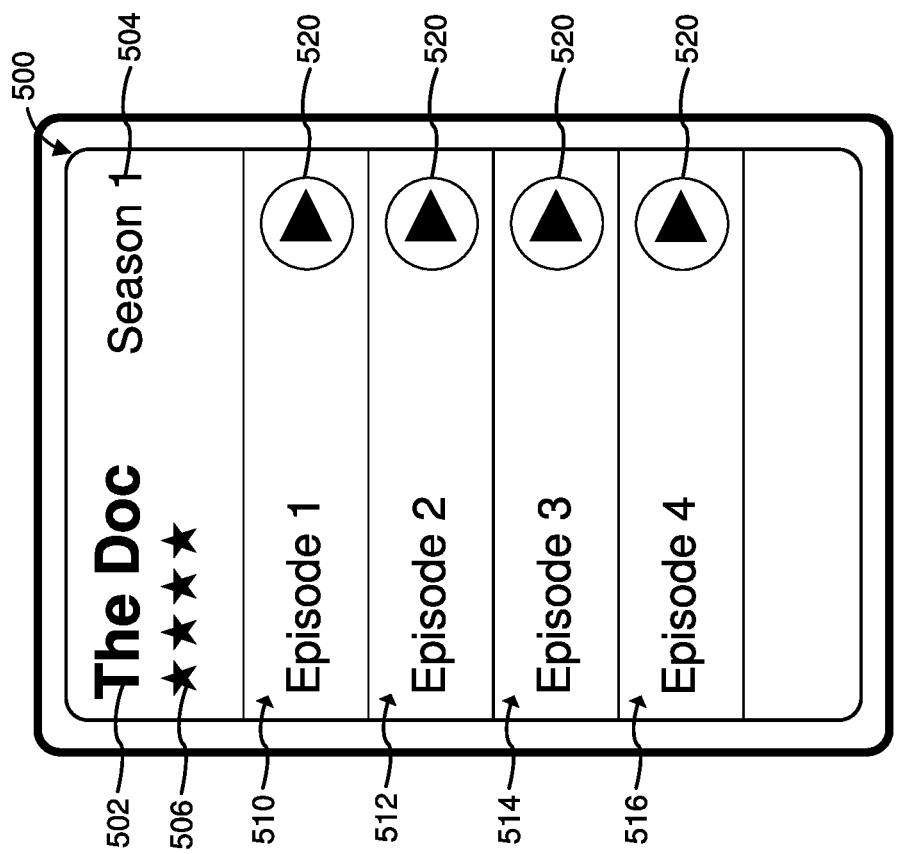

FIG. 5A is a diagram of an example user interface 500 in accordance with some implementations. The user interface 500 displays information regarding a content series (e.g., a show). In the example of FIG. 5A, the user interface 500 includes a show name 502, a season number 504, a rating 506, a first episode representation 510, a second episode representation 512, a third episode representation 514, a fourth episode representation 516, and play affordances 520 for each episode.

Figure 5C:
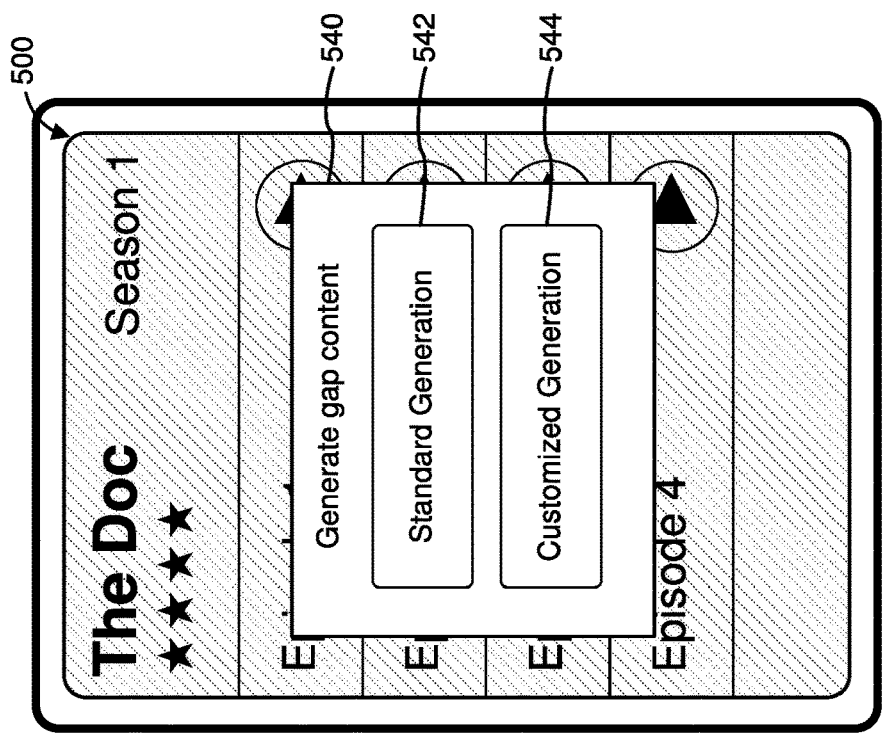
Figure 5B:
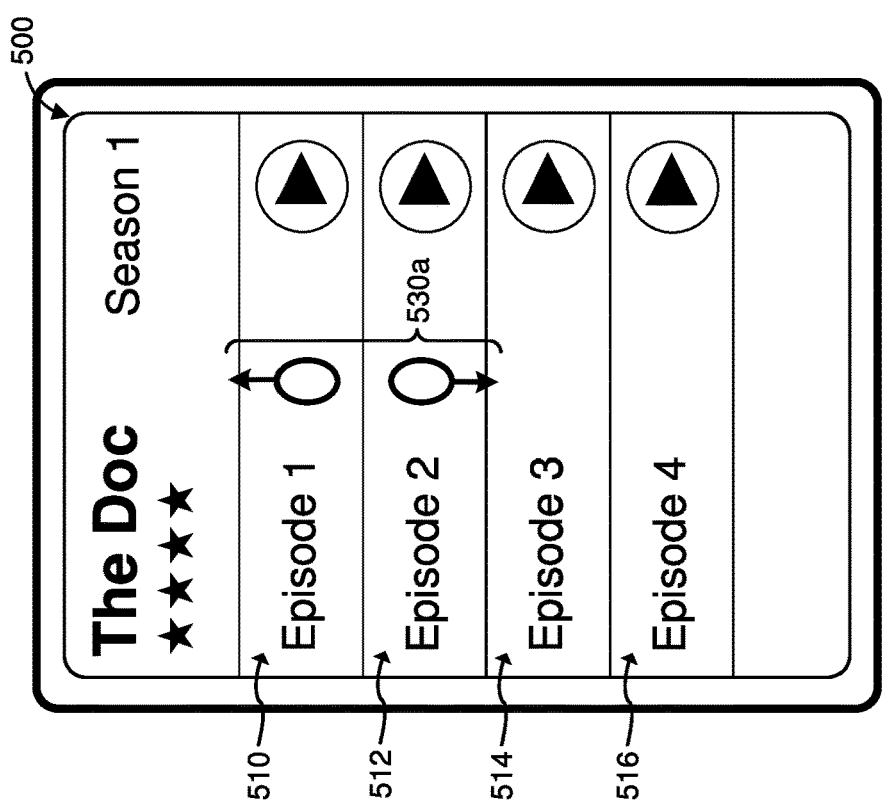

FIG. 5B illustrates a user input 530a that corresponds to a request to create an intermediary emergent content item (e.g., gap content, for example, a gap episode). In the example of FIG. 5B, detecting the user input 530a includes detecting contacts that are moving the first episode representation 510 and the second episode representation 512 away from each other. In some implementations, the user input 530a includes a zoom gesture that zooms between the first episode representation 510 and the second episode representation 512. In some implementations, the user input 530a corresponds to a request to create an intermediary emergent content item that spans an intermediary time duration between the first episode and the second episode of the show.

FIG. 5C illustrates a prompt 540 that includes a standard generation affordance 542 and a customized generation affordance 544. In some implementations, the user interface 500 displays the prompt 540 in response to receiving the user input 530a. In some implementations, a user selection of the standard generation affordance 542 corresponds to a request to generate the intermediary emergent content item with default settings. In some implementations, a user selection of the customized generation affordance 544 corresponds to a request to generate the intermediary emergent content item with customized settings.

Figure 5E:
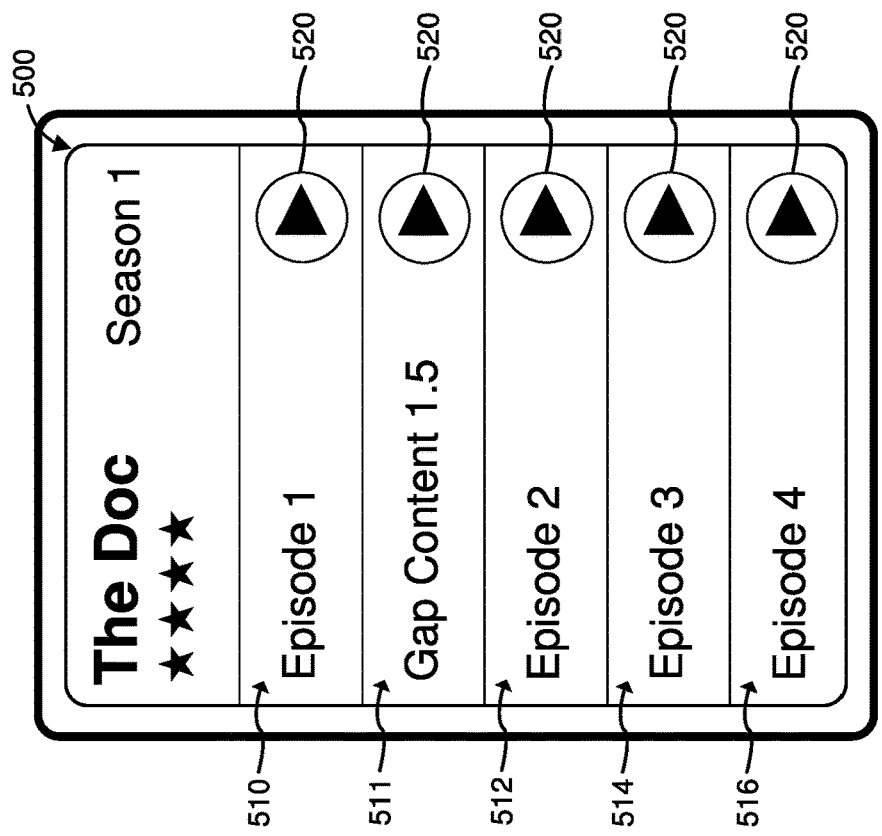
Figure 5D:
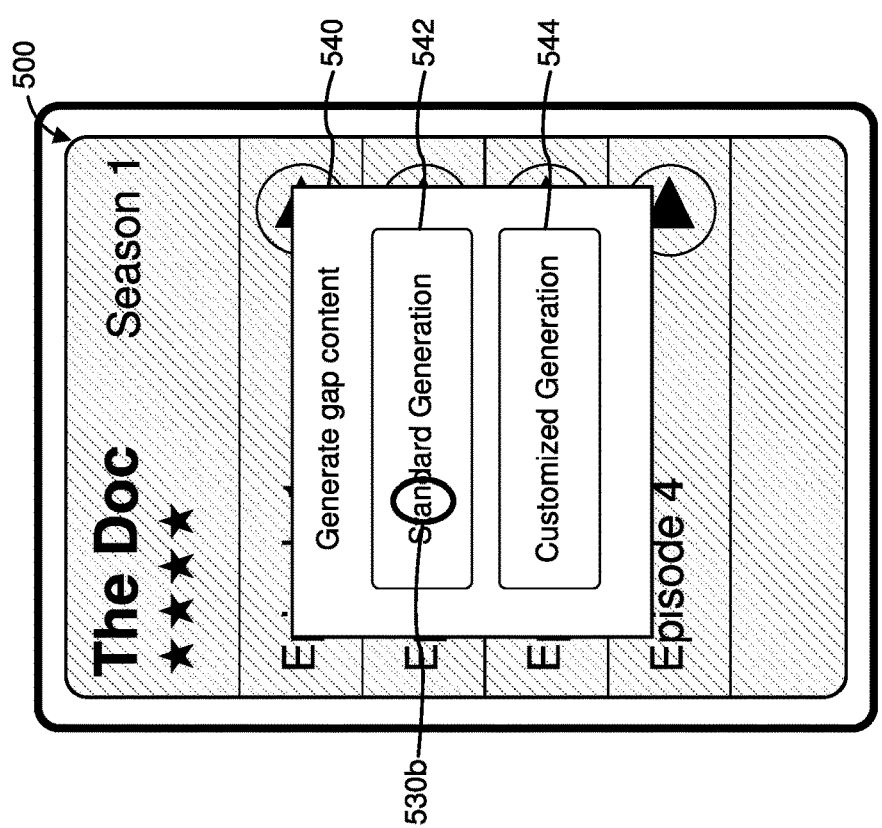

FIG. 5D illustrates a user input 530b that selects the standard generation affordance 542. In some implementations, the user input 530b corresponds to a request to generate the intermediary emergent content item with default settings.

FIG. 5E illustrates a gap content representation 511 that represents an intermediary emergent content item (e.g., gap content) that spans an intermediary time duration between the first episode and the second episode. As shown in FIG. 5E, the gap content representation 511 is associated with a play affordance 520. A user selection of the play affordance 520 triggers playback of the gap content.

Figure 5F:
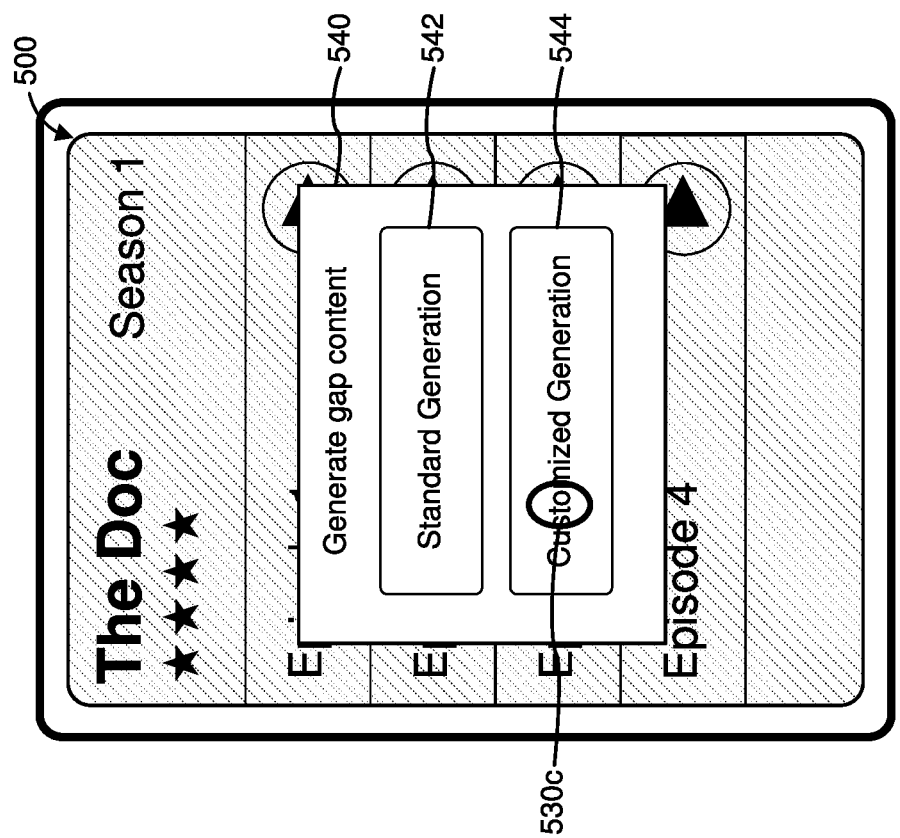

FIG. 5F illustrates a user input 530c that selects the customized generation affordance 544. In some implementations, the user input 530c corresponds to a request to generate the gap content based on customized settings (e.g., instead of or in addition to default settings).

Figure 5G:
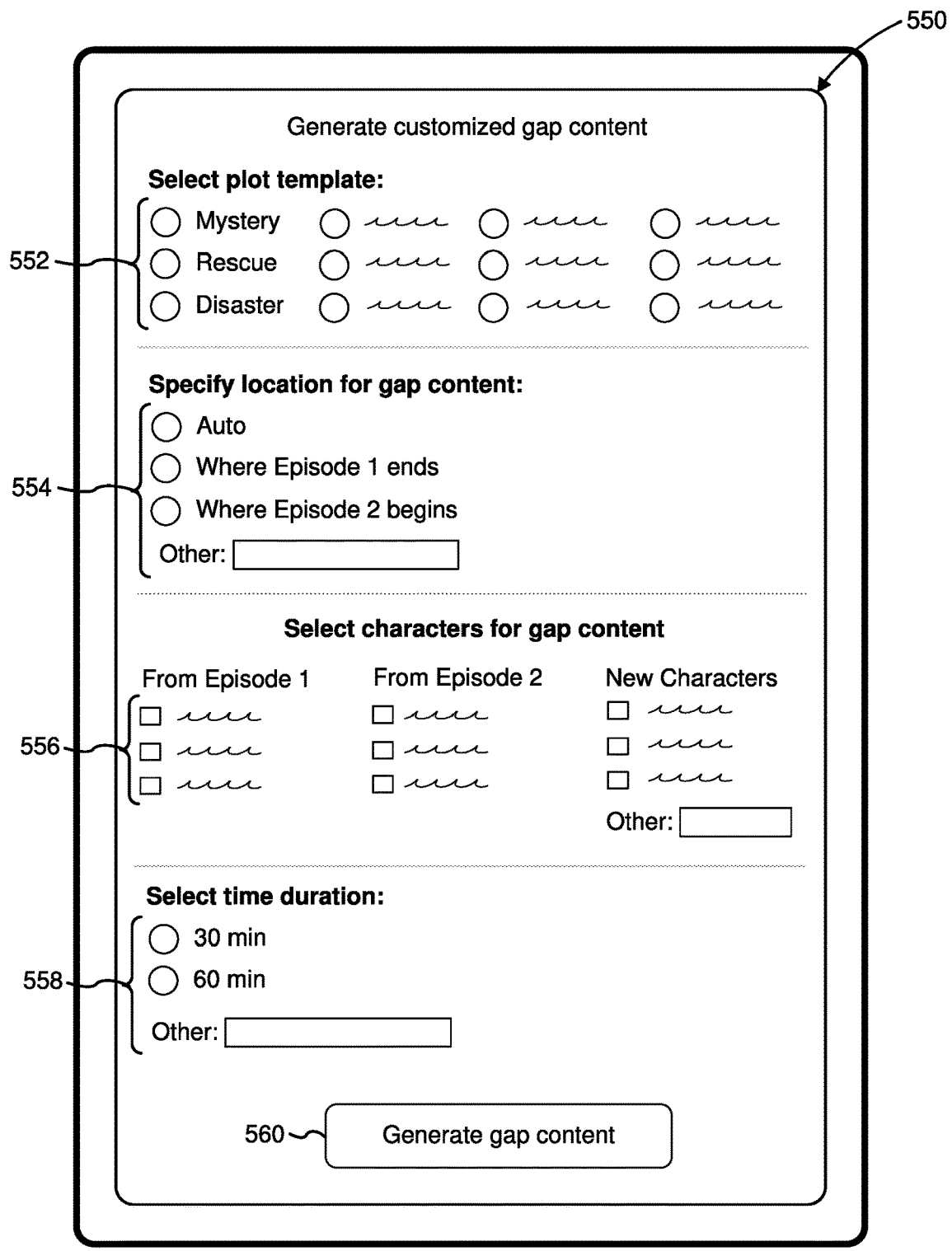

FIG. 5G illustrates an example customization screen 550 that allows a user to customize the generation of the gap content. In the example of FIG. 5G, the customization screen 550 includes plot affordances 552, location affordances 554, action-performing element affordances 556, time affordances 558, and a generation affordance 560.

The plot affordances 552 allow a user to select a plot template for the gap content. For example, in some implementations, the plot affordances 552 allow the user to select one of the plot templates 162 shown in FIG. 1.

The location affordances 554 allow a user to select a location for the gap content. In some implementations, the location affordances 554 allow the user to select the location where the first episode ended. In some implementations, the location affordances 554 allow the user to select the location where the second episode begins. In some implementations, the location affordances 554 allow the user to specify a location that is different from the locations of the first and second episodes.

The action-performing element affordances 556 allow a user to select action-performing elements for the gap content. In some implementations, the action-performing element affordances 556 allow the user to select action-performing elements from the first episode. In some implementations, the action-performing element affordances 556 allow the user to select action-performing elements from the second episode. In some implementations, the action-performing element affordances 556 allow the user to select other action-performing elements that were not included present in the first and second episodes.

The time affordances 558 allow a user to select a time duration for the gap content. In some implementations, the time affordances allow the user to specify a time duration for the gap content that is different from suggested time durations.

The generation affordance 560 allows a user to generate the gap content based on the selections of the plot affordances 552, the location affordances 554, the action-performing element affordances 556 and the time affordances 558.

Referring to FIG. 5H, in some implementations, some of the plot affordances 552 are not selectable. In the example of FIG. 5H, the rescue plot affordance is not selectable. In some implementations, certain plot affordances are not selectable based on the type of plots that the first and second episodes are associated with. For example, if the first and second episodes are associated with a comedy plot, then the rescue plot affordance is not selectable for the gap content.

In some implementations, some of the location affordances 554 are not selectable. In the example of FIG. 5H, the location where the first episode ended is not available for the gap content (e.g., because the location was damaged/destroyed at the end of the first episode).

In some implementations, some of the action-performing element affordances are not selectable. For example, if a particular action-performing element died during the first episode, then the corresponding action-performing element affordance is not selectable because that particular action-performing element is no longer available for the gap content.

Referring to FIG. 5I, in some implementations, the gap content representation 511 is associated with a modification affordance 570 and a sharing affordance 580. The modification affordance 570 allows a user to modify the gap content. The sharing affordance 580 allows a user to share the gap content. FIG. 5I illustrates a user input 530d selecting the modification affordance 570.

FIG. 5J illustrates a modification screen 572 that is displayed in response to the user input 530d selecting the modification affordance 570. In some implementations, the modification screen 572 includes the plot affordances 552, the location affordances 554, the action-performing element affordances 556, and the time affordances 558. As such, the modification screen 572 allows the user to change the plot template, the location, the action-performing elements, and/or the time duration for the gap content.

Figure 5L:
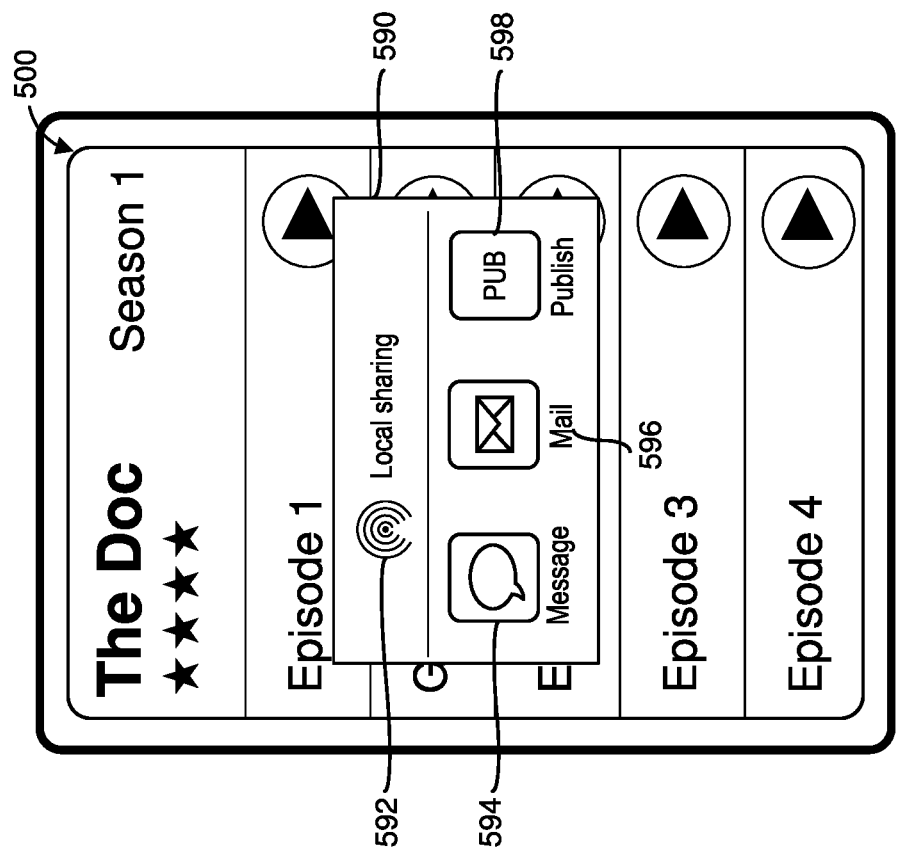
Figure 5K:
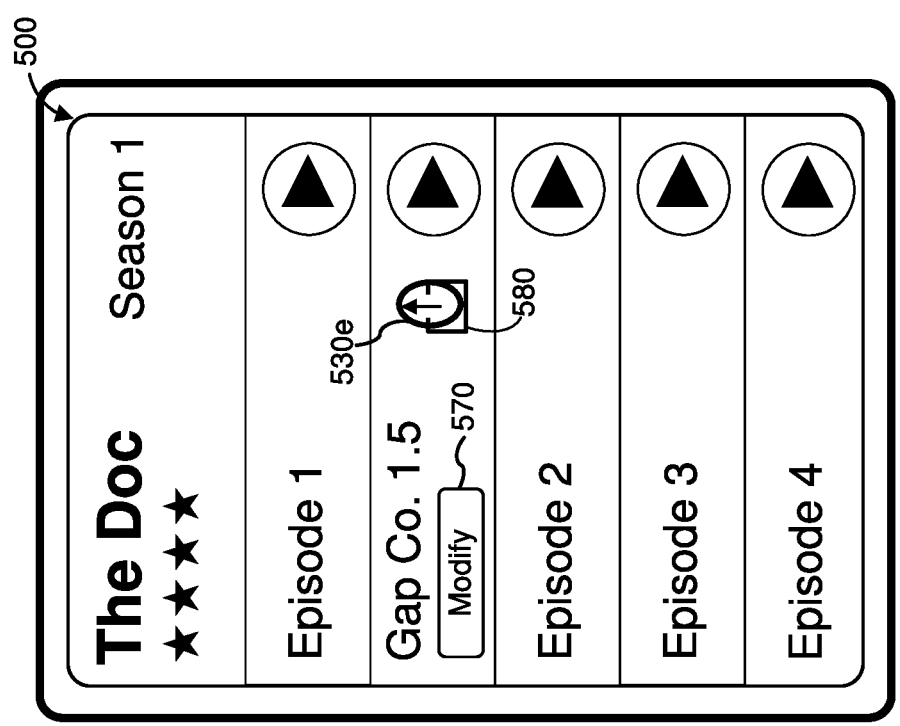

FIG. 5K illustrates a user input 530e selecting the sharing affordance 580. In some implementations, the user input 530e corresponds to a request to share the gap content with another user.

FIG. 5L illustrates a share sheet 590 that is displayed in response to the user input 530e. In some implementations, the share sheet 590 includes a local sharing affordance 592, a messaging affordance 594, a mail affordance 596 and a publish affordance 598. In some implementations, the local sharing affordance 592 allows the user to share the gap content with nearby devices. The messaging affordance 594 allows the user to send the gap content via a message (e.g., an instant message). The mail affordance 596 allows the user to send the gap content via e-mail. The publish affordance 598 allows the user to publish the gap content (e.g., on a content store) and obtain a credit for publishing the gap content.

Figure 6A:
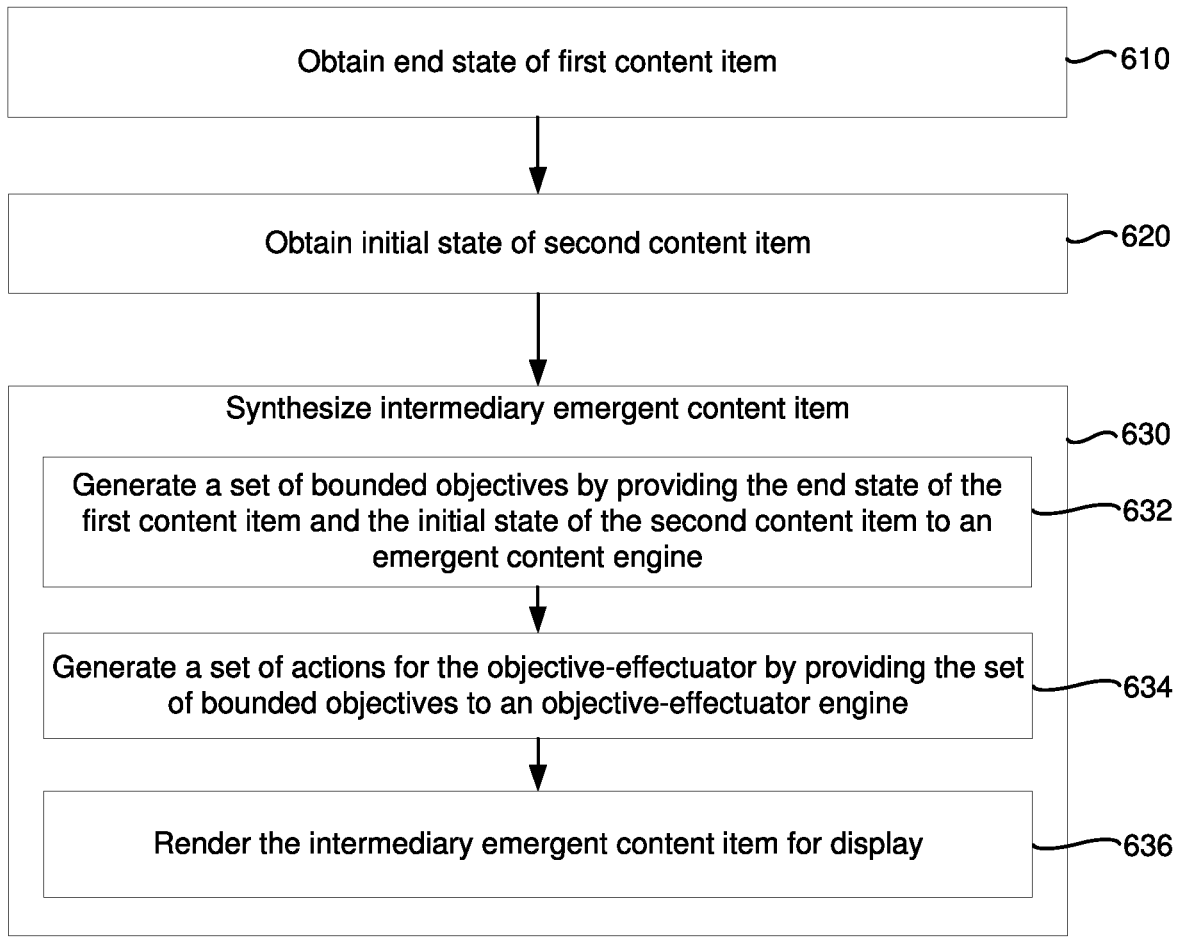
FIGS. 6A-6D are flowchart representations of a method of generating intermediary emergent content in accordance with some implementations.

FIG. 6A is a flowchart representation of a method 600 of generating an intermediary emergent content item. In various implementations, the method 600 is performed by a device with a non-transitory memory and one or more processors coupled with the non-transitory memory (e.g., the device 900 shown in FIG. 9). In some implementations, the method 600 is performed by processing logic, including hardware, firmware, software, or a combination thereof. In some implementations, the method 600 is performed by a processor executing code stored in a non-transitory computer-readable medium (e.g., a memory). Briefly, in some implementations, the method 600 includes obtaining an end state of a first content item, obtaining an initial state of a second content item, and synthesizing an intermediary emergent content item based on the end state of the first content item and the initial state of the second content item.

As represented by block 610, in some implementations, the method 600 includes obtaining an end state of a first content item spanning a first time duration. For example, as illustrated in FIG. 3B, the method 600 includes obtaining the end state 146 of the first content item 140 spanning the first time duration T1. In some implementations, the end state of the first content item indicates a first state of an objective-effectuator at the end of the first time duration. For example, as illustrated in FIG. 2B, the end state 146 of the first content item 140 indicates a first state of the boy objective-effectuator 222.

As represented by block 620, in some implementations, the method 600 includes obtaining an initial state of a second content item spanning a second time duration. For example, as illustrated in FIG. 3B, the method 600 includes obtaining the initial state 156 of the second content item 150 spanning the second time duration T2. In some implementations, the initial state of the second content item indicates a second state of the objective-effectuator at the beginning of the second time duration. For example, as illustrated in FIG. 2F, the initial state 156 of the second content item 150 indicates a second state of the boy objective-effectuator 222.

As represented by block 630, in some implementations, the method 600 includes synthesizing an intermediary emergent content item spanning over an intermediary time duration that is between the end of the first time duration and the beginning of the second time duration. For example, as illustrated in FIG. 3B, the intermediary emergent content item 310 spans the intermediary duration T2 that is between the first time duration T1 and the second time duration T3.

As represented by block 632, in some implementations, the method 600 includes generating a set of bounded objectives for the objective-effectuator by providing the end state of the first content item and the initial state of the second content item to an emergent content engine. For example, generating the set of bounded objectives 112 shown in FIG. 3B by providing the end state 146 of the first content item 140 and the initial state 156 of the second content item 150 to the emergent content engine 110. In some implementations, the set of bounded objectives are bounded by the end state of the first content item and the initial state of the second content item. For example, the objectives 112 shown in FIG. 3B are bounded by the end state 146 of the first content item 140 and the initial state 156 of the second content item 150.

As represented by block 634, in some implementations, the method 600 includes generating a set of actions for the objective-effectuator by providing the set of bounded objectives to an objective-effectuator engine. For example, generating the set of actions 122-1 shown in FIG. 3B for an objective-effectuator (e.g., the boy objective-effectuator 222 shown in FIG. 2C) by providing the set of bounded objectives 112 to the objective-effectuator engine 120-1.

As represented by block 636, in some implementations, the method 600 includes rendering the intermediary emergent content item for display. For example, as shown in FIG. 1, the generated actions 122-1, . . . , 122-n that form the intermediary emergent content item are sent to a rendering and display pipeline.

In various implementations, synthesizing the intermediary emergent content item allows the user to view new content that was not originally created by the entity that created the first content item and the second content item. As such, synthesizing the intermediary emergent content item provides the user with an option to watch additional content thereby enhancing user experience and increasing the operability of the device.

Figure 6B:
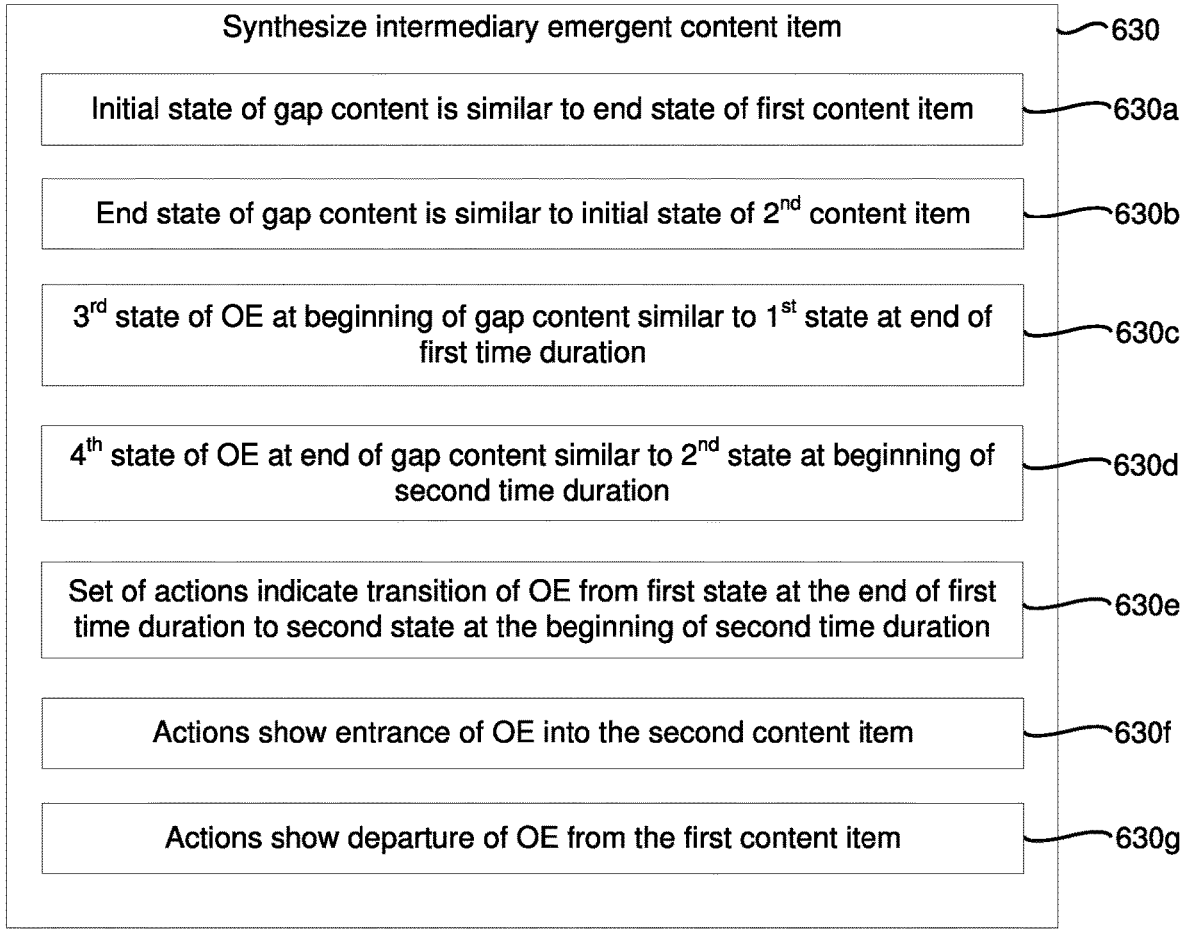
Figure 6C:
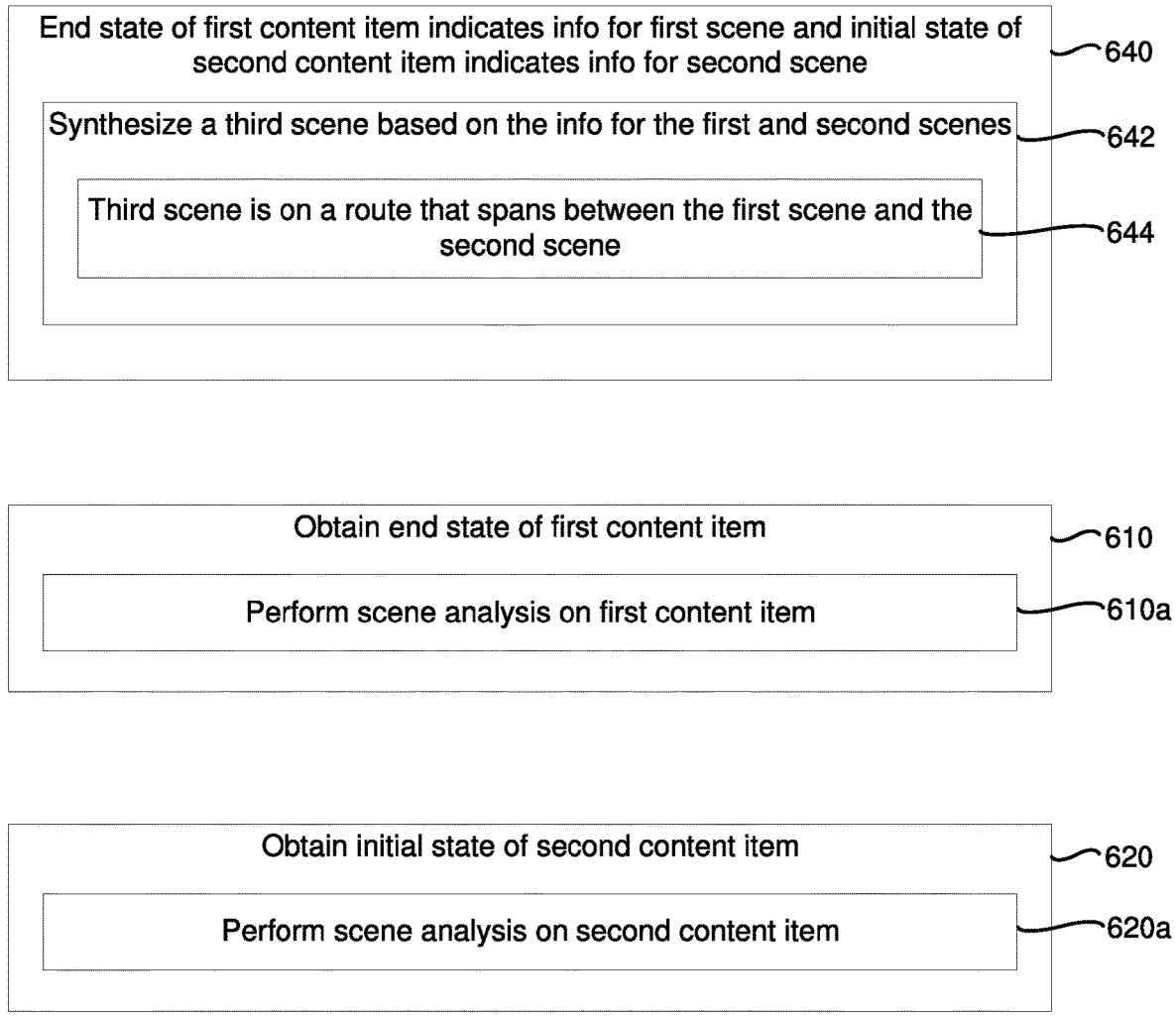

Referring to FIG. 6B, as represented by block 630a, in some implementations, the initial state of the intermediary emergent content item is within a degree of similarity to the end state of the first content item. For example, as illustrated in FIG. 2C, the initial state 220a of the intermediary emergent content item 220 matches (e.g., is identical to) the end state 146 of the first content item 140. In various implementations, the initial state of the intermediary emergent content item being within a degree of similarity to the end state of the first content item provides continuity between the intermediary emergent content item and the end state of the first content item thereby making the intermediary emergent content item appear more realistic.

As represented by block 630b, in some implementations, the end state of the intermediary emergent content item is within a degree of similarity to the initial state of the second content item. For example, as illustrated in FIG. 2F, the end state 220d of the intermediary emergent content item 220 matches (e.g., is identical to) the initial state 156 of the second content item 150. In various implementations, the end state of the intermediary emergent content item being within a degree of similarity to the initial state of the second content item provides continuity between the intermediary emergent content item and the initial state of the second content item thereby making the intermediary emergent content item appear more realistic.

As represented by block 630c, in some implementations, a third state of the objective-effectuator at the beginning of the intermediary time duration is within a degree of similarity to the first state of the objective-effectuator at the end of the first time duration. For example, as illustrated in FIG. 2C, a state of the boy objective-effectuator 222 at time t2,0 matches (e.g., is identical to) a state of the boy action-performing element 202 at time t1,n.

As represented by block 630d, in some implementations, a fourth state of the objective-effectuator at the end of the intermediary time duration is within a degree of similarity to the second state of the objective-effectuator at the beginning of the second time duration. For example, as illustrated in FIG. 2F, a state of the boy objective-effectuator 222 at time t2,n matches a state of the boy action-performing element 202 at time t3,0.

As represented by block 630e, in some implementations, the set of actions indicate a transition of the objective-effectuator from the first state at the end of the first time duration to the second state at the beginning of the second time duration. For example, FIGS. 2C-2F indicate a transition of the boy objective-effectuator 222 from its state at the end of the first time duration T1 to its state at the beginning of the second time duration T3.

As represented by block 630f, in some implementations, the objective-effectuator is absent in the first content item and present in the second content item, and the set of actions correspond to an entrance of the objective-effectuator into the second content item.

As represented by block 630g, in some implementations, the objective-effectuator is present in the first content item and absent in the second content item, and the set of actions correspond to a departure of the objective-effectuator from the first content item. For example, FIGS. 2C-2F illustrate a departure of the girl objective-effectuator 224.

As represented by block 640, in some implementations, the end state of the first content item indicates scene information characterizing a first scene included within the first content item and the initial state of the second content item indicates scene information characterizing a second scene included within the second content item.

As represented by block 642, in some implementations, synthesizing the intermediary emergent content item includes synthesizing a third scene based on the scene information characterizing the first scene and the scene information characterizing the second scene.

As represented by block 644, in some implementations, the first scene corresponds to a first geographical location, the second scene corresponds to a second geographical location, and the third scene corresponds to a third geographical location that is on a route that spans between the first geographical location and the second geographical location.

As represented by block 610a, in some implementations, the method 600 includes performing scene analysis on the first content item in order to identify the objective-effectuator and determine the first state of the objective-effectuator. In various implementations, performing scene analysis reduces the need for a user to manually specify the end state of the first content item thereby reducing the number of user interactions with the device and improving battery life.

As represented by block 620a, in some implementations, the method 600 includes performing scene analysis on the second content item in order to identify the objective-effectuator and determine the second state of the objective-effectuator. In various implementations, performing scene analysis reduces the need for a user to manually specify the initial state of the second content item thereby reducing the number of user interactions with the device and improving battery life.

Figure 6D:
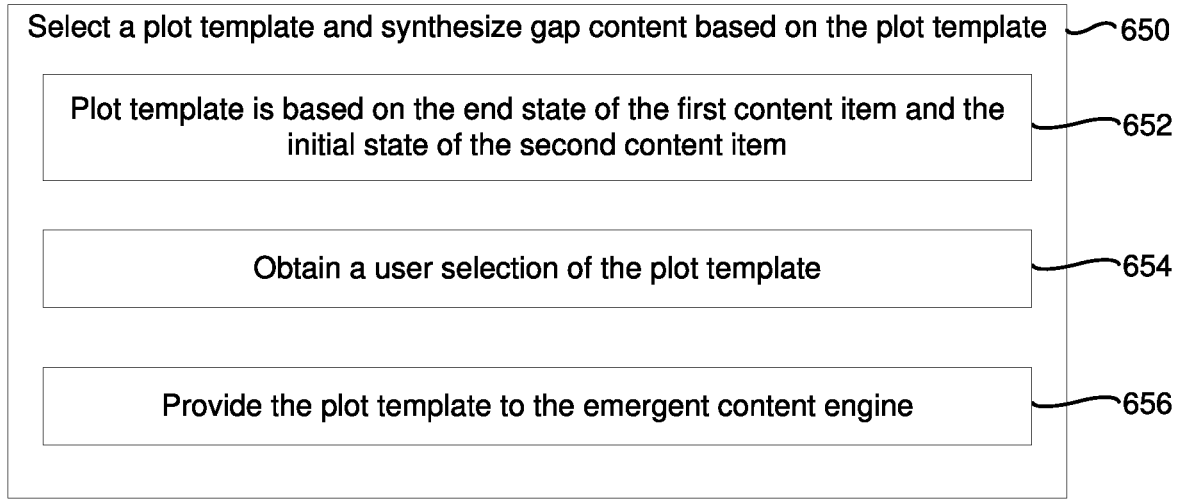

Referring to FIG. 6D, as represented by block 650, in some implementations, the method 600 includes selecting a plot template from a plurality of plot templates, and synthesizing the intermediary emergent content item based on the plot template. For example, as illustrated in FIG. 1, the emergent content engine 110 selects a plot template 162 from the plot template datastore 160, and the emergent content engine 110 utilizes the selected plot template 162 to generate the objectives 112. In various implementations, synthesizing the intermediary emergent content item based on a plot template makes the intermediary emergent content item appear as realistic as the first and second content items thereby enhancing user experience and improving the operability of the device.

As represented by block 652, in some implementations, the plot template is selected based on the end state of the first content item and the initial state of the second content item. For example, in some implementations, the method 600 includes selecting the same plot template that is used by the first content item and the second content item.

As represented by block 654, in some implementations, selecting the plot template includes obtaining a user selection of the plot template (e.g., via the plot affordances 552 shown in FIG. 5G). In various implementations, allowing the user to select the plot template gives the user control over the plot/storyline of the intermediary emergent content item thereby enhancing user experience and improving the operability of the device.

As represented by block 656, in some implementations, the method 600 includes providing the plot template to the emergent content engine in order to allow the emergent content engine to generate the set of bounded objectives based on the plot template. For example, as illustrated in FIG. 2B, the interim objectives 210-218 are generated based on the plot template 162a.

Figure 7A:
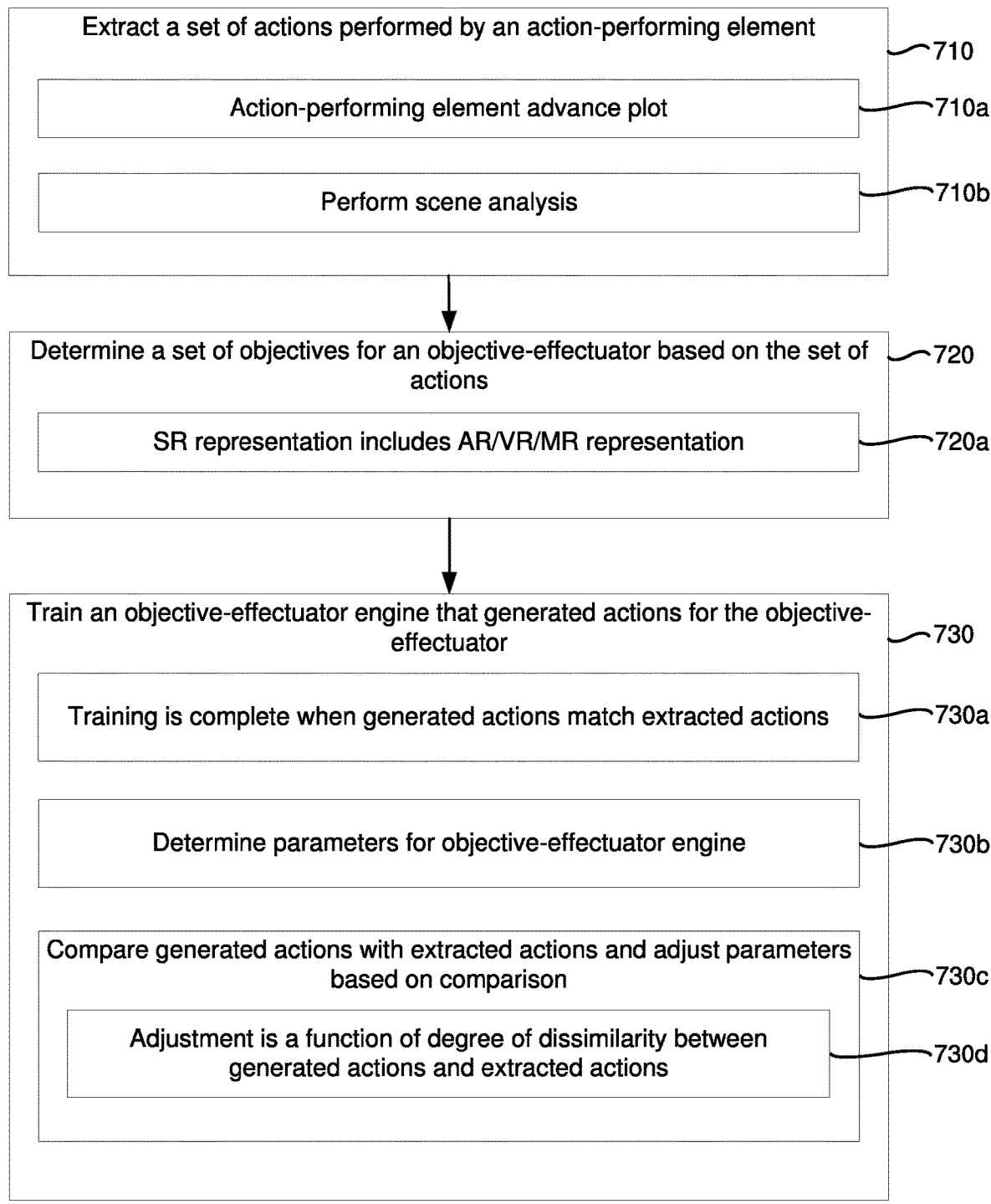
FIGS. 7A-7B are flowchart representations of a method of training an objective-effectuator engine in accordance with some implementations.

FIG. 7A is a flowchart representation of a method 700 of training an objective-effectuator engine to generate actions that correspond to an intermediary emergent content item. In various implementations, the method 700 is performed by a device with a non-transitory memory and one or more processors coupled with the non-transitory memory (e.g., the device 900 shown in FIG. 9). In some implementations, the method 700 is performed by processing logic, including hardware, firmware, software, or a combination thereof. In some implementations, the method 700 is performed by a processor executing code stored in a non-transitory computer-readable medium (e.g., a memory). Briefly, in some implementations, the method 700 includes extracting a set of actions performed by an action-performing element, determining a set of objectives for an objective-effectuator based on the set of actions, and training an objective-effectuator engine that generates actions for the objective-effectuator.

As represented by block 710, in some implementations, the method 700 includes extracting, from a content item, a set of actions performed by an action-performing element in the content item. For example, as illustrated in FIG. 3A, the action extractor 174 extracts the first set of actions 142 from the first content item 140.

As represented by block 720, in some implementations, the method 700 includes determining, by semantic analysis, a set of objectives for an objective-effectuator based on the set of actions. For example, as illustrated in FIG. 3A, the objective determiner 176 utilizes semantic analysis to derive the first set of learned objectives 144 from the extracted actions 142. In some implementations, a synthesized reality (SR) representation of the objective-effectuator corresponds to the action-performing element.

As represented by block 730, in some implementations, the method 700 includes training, based on the set of objectives, an objective-effectuator engine that generates actions for the objective-effectuator. For example, as illustrated in FIG. 3A, the trainer 130 trains the objective-effectuator engine 120 based on the first set of learned objectives 144. In some implementations, the training is complete when actions generated by the objective-effectuator engine are within an acceptability threshold of the set of actions extracted from the content item. For example, as illustrated in FIG. 3A, the training of the objective-effectuator engine 120 is complete when the generated actions 122 are within an acceptability threshold of the extracted actions 142. In some implementations, the training is complete when the actions generated by the objective-effectuator engine are within a degree of similarity to (e.g., identical to) the set of actions extracted from the content item.

In various implementations, training the objective-effectuator engine allows the objective-effectuator engine to generate actions that correspond to an intermediary emergent content item thereby providing the user with more content to watch. Providing the user more content to watch enhances the user experience and improves the operability of the device. Enabling the objective-effectuator engine to generate actions that corresponds to an intermediary emergent content item is less resource-intensive than a content creator curating content. Hence, training the objective-effectuator engine tends to conserve computing resources.

As represented by block 710a, in some implementations, the action-performing element performs actions that advance a plot in the content item. In some implementations, the action-performing element is a character or an equipment (e.g., the boy action-performing element 202 shown in FIG. 2A).

As represented by block 710b, in some implementations, the method 700 includes performing scene analysis on the content item in order to identify the action-performing element and extract the set of actions that the action-performing element performs in the content item. For example, as shown in FIG. 3A, the action extractor 174 performs scene analysis on the first content item 140 and extracts the first set of actions 142 from the first content item 140.

As represented by block 720a, in some implementations, the SR representation includes an augmented reality (AR) representation. In some implementations, the SR representation includes a virtual reality (VR) representation. In some implementations, the SR representation includes a mixed reality (MR) representation.

As represented by block 730a, in some implementations, the method 700 includes determining that the training is complete when actions generated by the objective-effectuator engine are within a degree of similarity to the actions extracted from the content item. For example, as shown in FIG. 3A, the training of the objective-effectuator engine 120 is complete when the trainer 130 determines that the generated actions 122 match the extracted actions 142.

As represented by block 730b, in some implementations, the method 700 includes determining values of one or more parameters of the objective-effectuator engine. For example, as shown in FIG. 3A, the trainer 130 determines the parameters 132 for the objective-effectuator engine 120.

As represented by block 730c, in some implementations, the method 700 includes comparing the actions generated by the objective-effectuator engine with the set of actions extracted from the content item, and adjusting the values of the one or more parameters based on the comparison. For example, as shown in FIG. 3A, the action comparator 134 compares the generated actions 122 with the extracted actions 142, and the parameter determiner 136 adjusts the parameters 132 based on a difference between the generated actions 122 and the extracted actions 142.

As represented by block 730d, in some implementations, an amount of adjustment to the values of the one or more parameters is a function of a degree of dissimilarity between the actions generated by the objective-effectuator and the set of actions extracted from the content item. For example, as shown in FIG. 3A, the parameter determiner 136 adjusts the parameters 132 based on the difference between the generated actions 122 and the extracted actions 142.

Figure 7B:
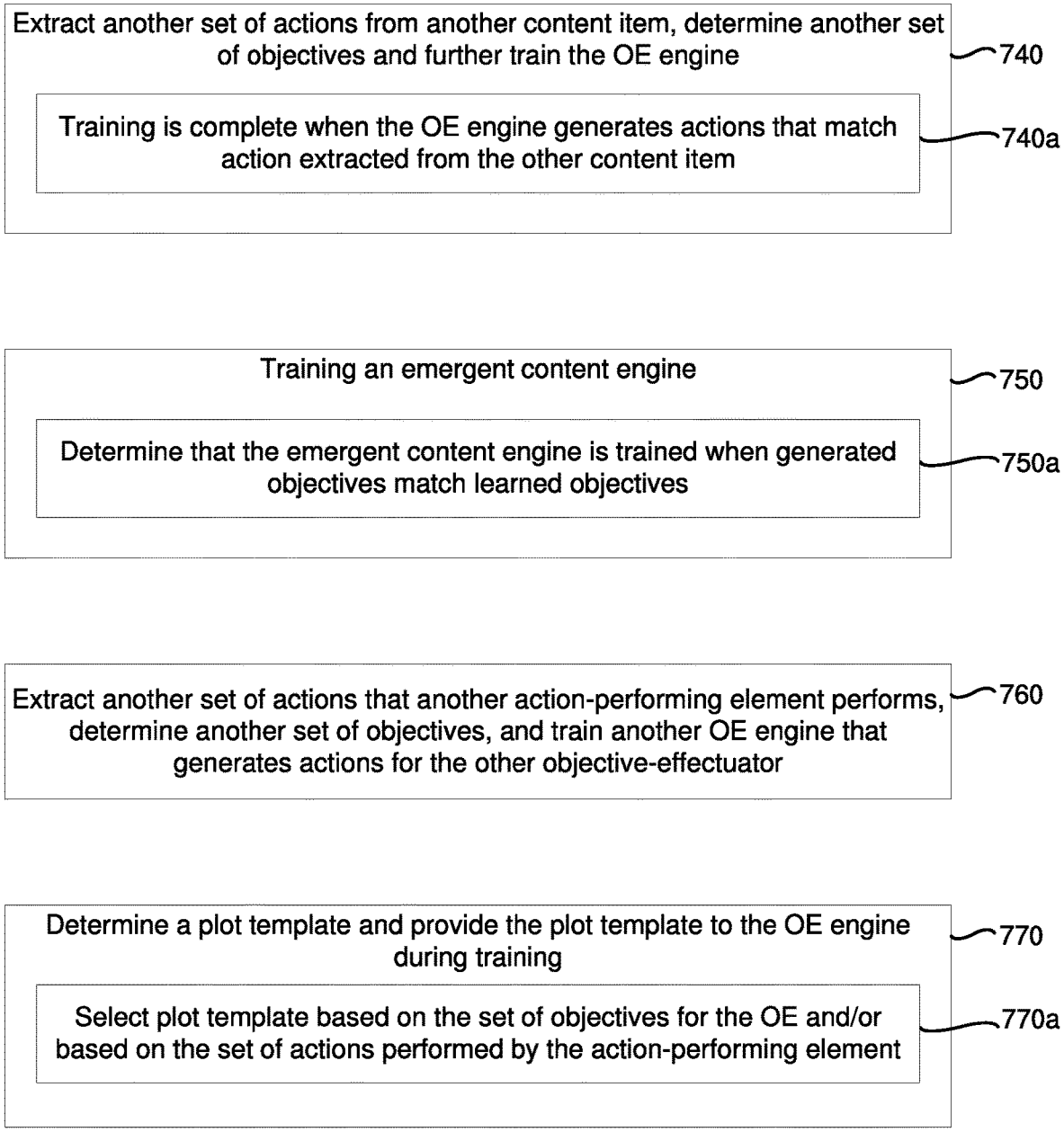

Referring to FIG. 7B, as represented by block 740, in some implementations, the method 700 includes extracting, from another content item, another set of actions that the objective-effectuator performs in the other content item. In some implementations, the method 700 includes determining another set of objectives based on the other set of actions. In some implementations, the method 700 includes further training the objective-effectuator engine based on the other set of objectives.

As represented by block 740a, in some implementations, the method 700 includes determining that the training is complete when the objective-effectuator engine generates a third set of actions that are within a degree of similarity to the first set of actions and a fourth set of actions that are within a degree of similarity to the second set of actions.

In various implementations, utilizing multiple content items (e.g., multiple episodes or an entire season of a show) to train an objective-effectuator engine results more realistic intermediary emergent content items thereby enhancing user experience and improving the operability of the device that generates the intermediary emergent content items.

As represented by block 750, in some implementations, the method 700 includes training, based on the set of actions, an emergent content engine that generates objectives for the objective-effectuator. For example, training the emergent content engine 110 shown in FIG. 1.

As represented by block 750a, in some implementations, the method 700 includes determining that the training of the emergent content engine is complete when the emergent content engine generates objectives that match the first set of objectives determined based on the first set of objectives. For example, as shown in FIG. 1, the training of the emergent content engine 110 is complete when the objectives 112 generated by the emergent content engine 110 match the first set of learned objectives 144 and/or the second set of learned objectives 154.

As represented by block 760, in some implementations, the method 700 includes extracting another set of actions that another action-performing element performs in the content item, determining another set of objectives based on the other set of actions, and training, based on the other set of objectives, another objective-effectuator engine that generates actions for another objective-effectuator that corresponds to the other action-performing element.

As represented by block 770, in some implementations, the method 700 includes determining a plot template that corresponds with the content item, and providing the plot template to the objective-effectuator engine during the training. For example, as shown in FIG. 1, the emergent content engine 110 selects one of the plot templates 162 from the plot template datastore 160.

As represented by block 770a, in some implementations, the method 700 includes selecting the plot template from a plurality of plot templates based on the set of objectives from the objective-effectuator and/or based on the set of actions performed by the action-performing element in the content item. Selecting the plot template based on the set of objectives and/or the set of actions makes the intermediary emergent content item appear more realistic thereby enhancing user experience and improving the effectiveness of the device that is synthesizing the intermediary emergent content item.

Figure 8A:
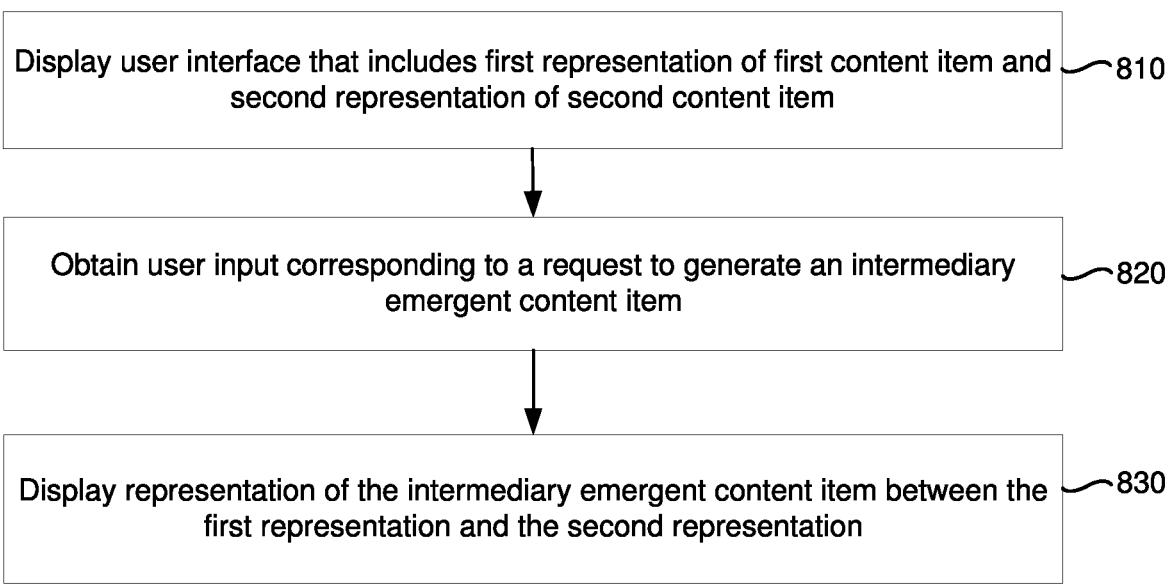
FIGS. 8A-8C are flowchart representations of a method of generating intermediary emergent content item in accordance with some implementations.

FIG. 8A is a flowchart representation of a method 800 of generating an intermediary emergent content item in accordance with some implementations. In various implementations, the method 800 is performed by a device with a non-transitory memory and one or more processors coupled with the non-transitory memory (e.g., the device 900 shown in FIG. 9). In some implementations, the method 800 is performed by processing logic, including hardware, firmware, software, or a combination thereof. In some implementations, the method 800 is performed by a processor executing code stored in a non-transitory computer-readable medium (e.g., a memory). Briefly, in some implementations, the method 800 includes displaying a user interface that includes representations of content items, obtaining a user input corresponding to a request to generate an intermediary emergent content item, and displaying a representation of the intermediary emergent content item.

As represented by block 810, in some implementations, the method 800 includes displaying, on the display, a user interface that includes a first representation of a first content item spanning a first time duration and a second representation of a second content item spanning a second time duration. For example, as shown in FIG. 5A, the user interface 500 includes the first episode representation 510 and the second episode representation 512.

As represented by block 820, in some implementations, the method 800 includes obtaining, via the input device, a user input corresponding to a request to generate an intermediary emergent content item spanning over an intermediary time duration that is between the end of the first time duration and the beginning of the second time duration. For example, as shown in FIG. 5B, the user input 530a corresponds to a request create gap content that spans an intermediary time duration that is between the first episode and the second episode.

As represented by block 830, in some implementations, the method 800 includes in response to obtaining the user input, displaying, on the display, a representation of the intermediary emergent content item between the first representation of the first content item and the second representation of the second content item. In some implementations, the intermediary emergent content item is synthesized after the user input is obtained. For example, as shown in FIG. 5E, the gap content representation 511 is displayed between the first episode representation 510 and the second episode representation 512.

Figure 8B:
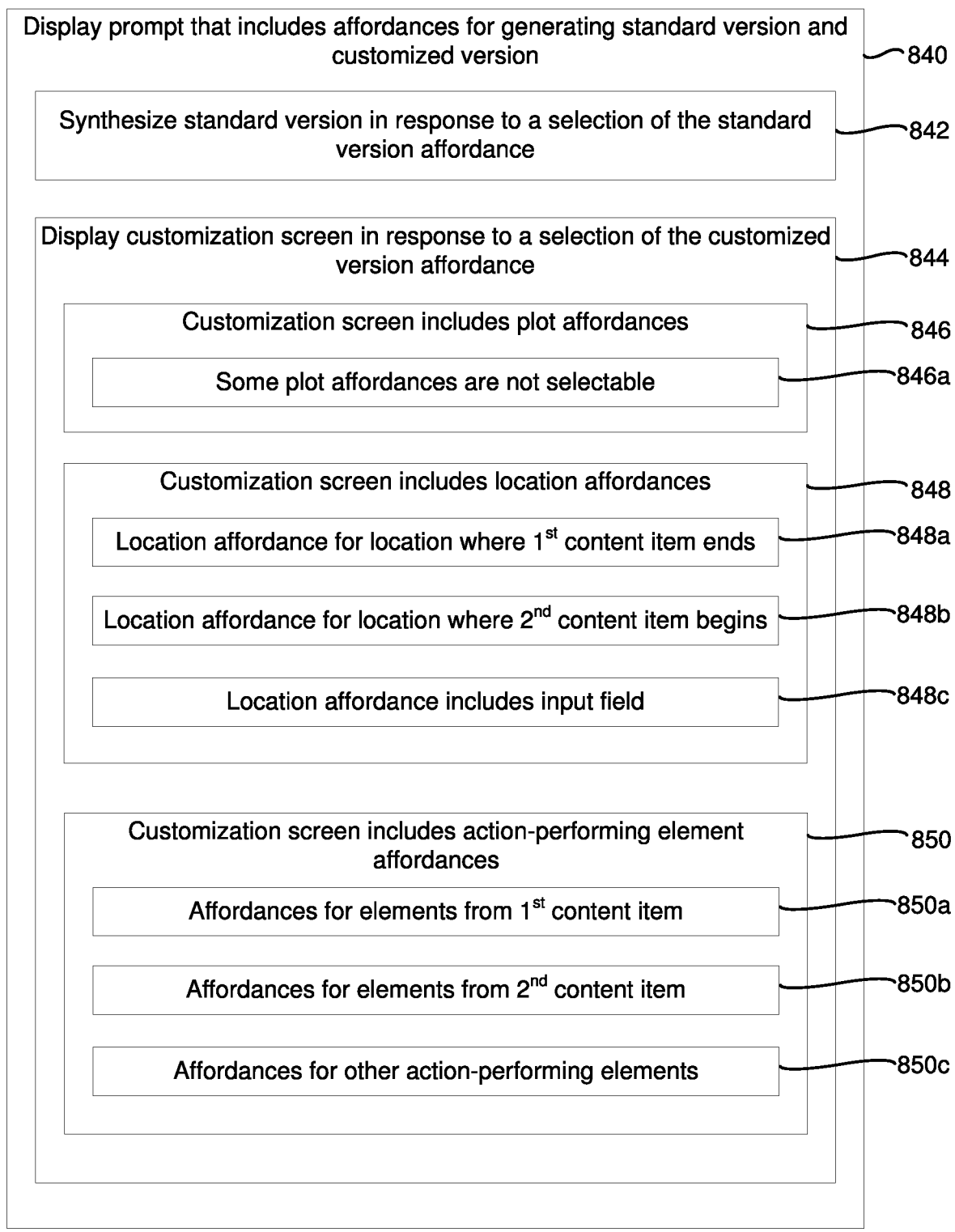

Referring to FIG. 8B, as represented by block 840, in some implementations, in response to obtaining the user input, the method 800 includes displaying a prompt that includes a first affordance that corresponds to generating a standard version of the intermediary emergent content item and a second affordance that corresponds to generating a customized version of the intermediary emergent content item. For example, as shown in FIG. 5D, the prompt 540 includes a standard generation affordance 542 and a customized generation affordance 544. Displaying the prompt allows the user to generate a standard version of the intermediary emergent content item or a customized version of the intermediary emergent content item thereby providing more device functionality.

As represented by block 842, in some implementations, the method 800 includes detecting a selection of the first affordance. In some implementations, in response to detecting the selection of the first affordance corresponding to the standard version, the method 800 includes synthesizing the standard version of the intermediary emergent content item without obtaining additional user inputs. For example, as shown in FIGS. 5D-5E, in response to receiving the user input 530*b*, the device generates the gap content and displays the gap content representation 511.

As represented by block 844, in some implementations, the method 800 includes detecting a selection of the second affordance. In some implementations, in response to detecting the selection of the second affordance corresponding to the customized version, the method 800 includes displaying, on the display, a customization screen that allows customization of the intermediary emergent content items. For example, as shown in FIGS. 5F-5G, in response to the user input 530*c*, the device displays the customization screen 550.

As represented by block 846, in some implementations, the customization screen includes a plurality of plot affordances that correspond to respective plot templates for the intermediary emergent content item. For example, as shown in FIG. 5G, the customization screen 550 includes the plot affordances 552.

As represented by block 846*a*, in some implementations, one or more of the plot affordances are not selectable based on an end state of the first content item and an initial state of the second content item. For example, as shown in FIG. 5H, some of the plot affordances 552 are not selectable.

As represented by block 848, in some implementations, the customization screen includes a plurality of location affordances that correspond to respective locations for the intermediary emergent content item. For example, as shown in FIG. 5G, the customization screen 550 includes the location affordances 554.

As represented by block 848*a*, in some implementations, one of the plurality of location affordances corresponds to an end state of the first content item. For example, as shown in FIG. 5G, one of the location affordances 554 allows the user to select a location for the gap content that corresponds to the location where the first episode ends.

As represented by block 848*b*, in some implementations, one of the plurality of location affordances corresponds to an initial state of the second content item. For example, as shown in FIG. 5G, one of the location affordances 554 allows the user to select a location for the gap content that corresponds to the location where the second episode begins.

As represented by block 848*c*, in some implementations, one of the plurality of location affordances includes an input field that accepts a location for the intermediary emergent content item. For example, as shown in FIG. 5G, one of the location affordances 554 includes an input field that allows the user to specify a location that is different from the location where the first episode ends and the location where the second episode begins.

As represented by block 850, in some implementations, the customization screen includes plurality of affordances that correspond to action-performing elements that can be included in the intermediary emergent content item. For example, as shown in FIG. 5G, the customization screen 550 includes various action-performing element affordances 556.

As represented by block 850*a*, in some implementations, one of the plurality of affordances corresponds to an action-performing element from the first content item. For example, as shown in FIG. 5G, some of the action-performing element affordances 556 correspond to action-performing elements from the first episode.

As represented by block 850*b*, in some implementations, one of the plurality of affordances corresponds to an action-performing element from the second content item. For example, as shown in FIG. 5G, some of the action-performing element affordances 556 correspond to action-performing elements from the second episode.

As represented by block 850*c*, in some implementations, one of the plurality of affordances corresponds to an action-performing element that was not present in the first content item and the second content item. For example, as shown in FIG. 5G, some of the action-performing element affordances 556 correspond to action-performing elements that are neither present in the first episode nor in the second episode.

Figure 8C:
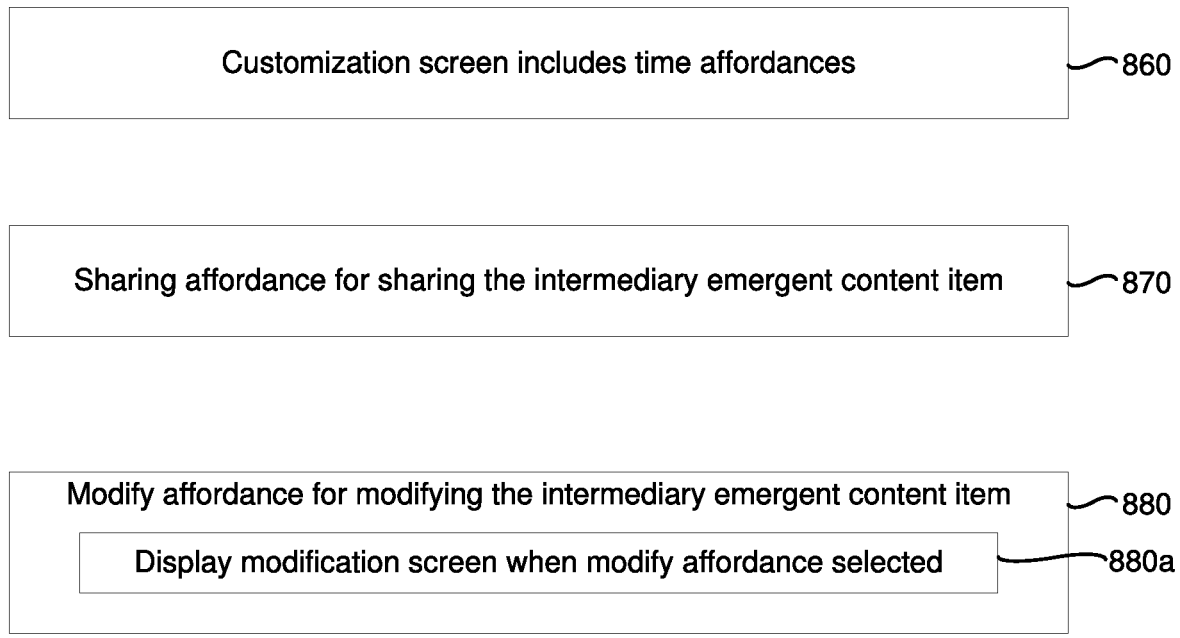

Referring to FIG. 8C, as represented by block 860, in some implementations, the customization screen includes a plurality of time affordances that correspond to respective time durations for the intermediary emergent content item. For example, as shown in FIG. 5G, the customization screen 550 includes the time affordances 558.

As represented by block 870, in some implementations, the representation of the intermediary emergent content item is associated with a share affordance that allows sharing the intermediary emergent content item with other devices. For example, as shown in FIG. 5I, the gap content representation 511 is associated with the sharing affordance 580.

As represented by block 880, in some implementations, the representation of the intermediary emergent content item is associated with a modify affordance that allows modifying the intermediary emergent content item. For example, as shown in FIG. 5I, the gap content representation 511 is associated with the modification affordance 570.

As represented by block 880*a*, in some implementations, the method 800 includes detecting a selection of the modify affordance. In response to detecting the selection of the modify affordance, the method 800 includes displaying a modification screen that allows modification of a plot template, a location, action-performing elements and a time duration associated with the intermediary emergent content item. For example, as shown in FIGS. 5I-5J, in response to receiving the user input 530*d*, the modification screen 572 is displayed.

Figure 9:
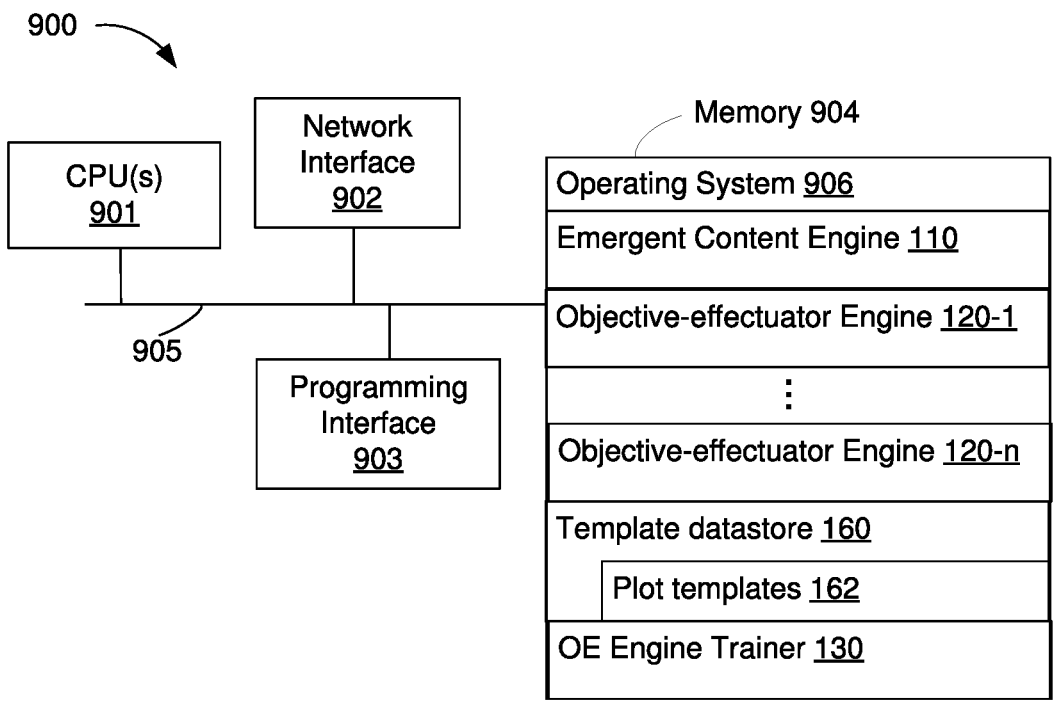
FIG. 9 is a block diagram of a server system that generated intermediary emergent content in accordance with some implementations.

FIG. 9 is a block diagram of a device 900 in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 900 includes one or more processing units (CPUs) 901, a network interface 902, a programming interface 903, a memory 904, and one or more communication buses 905 for interconnecting these and various other components.

In some implementations, the network interface 902 is provided to, among other uses, establish and maintain a metadata tunnel between a cloud hosted network management system and at least one private network including one or more compliant devices. In some implementations, the one or more communication buses 905 include circuitry that interconnects and controls communications between system components. The memory 904 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 904 optionally includes one or more storage devices remotely located from the one or more CPUs 901. The memory 904 comprises a non-transitory computer readable storage medium.

In some implementations, the memory 904 or the non-transitory computer readable storage medium of the memory 904 stores the following programs, modules and data structures, or a subset thereof including an optional operating system 906, the emergent content engine 110, the objective-effectuator engines 120-1, . . . , 120-n, the plot template datastore 160 including the plot templates 162, and the objective-effectuator trainer 130.

Figure 10:
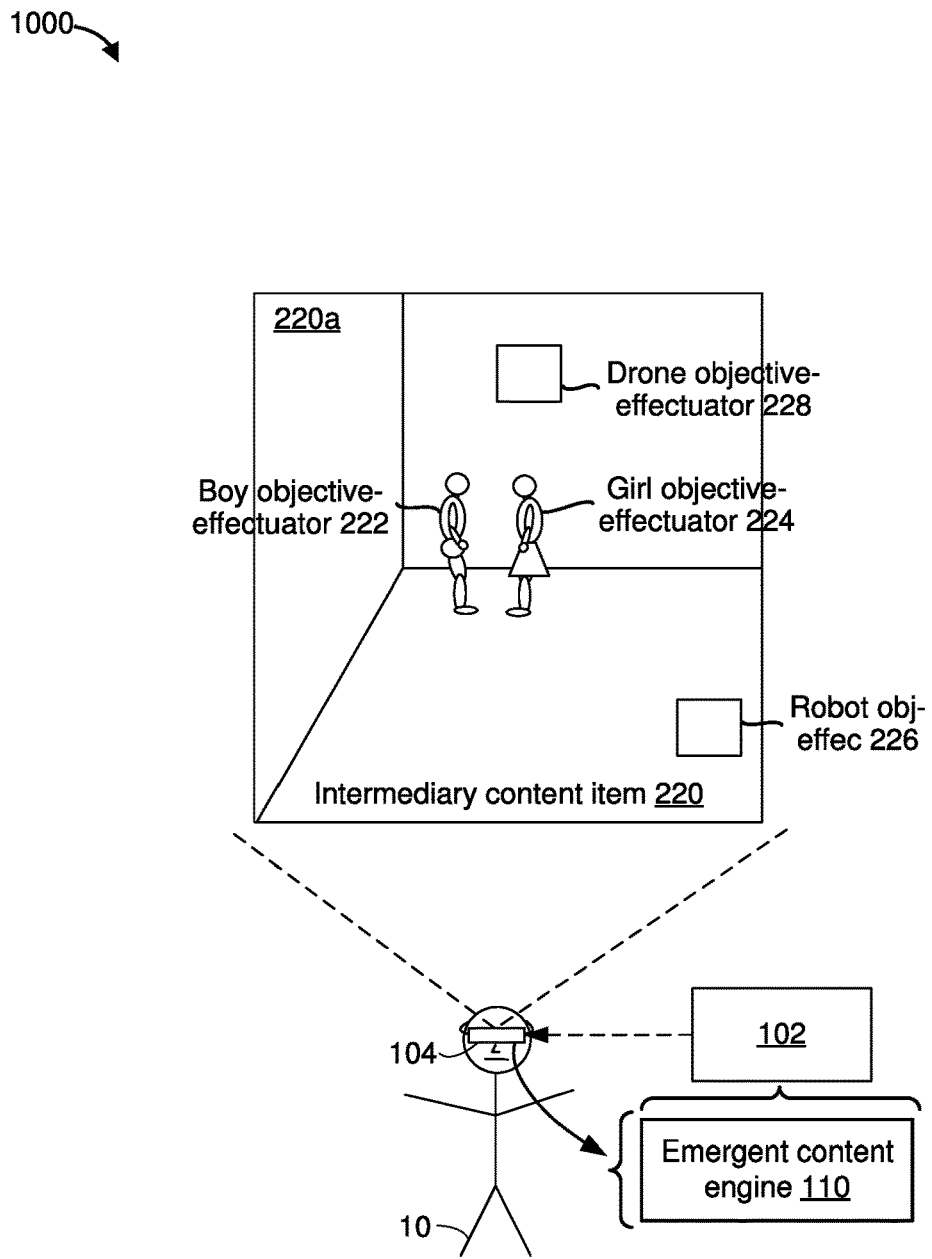
FIG. 10 is a diagram of an example operating environment in accordance with some implementations.

Referring to FIG. 10, an example operating environment 1000 includes a controller 102 and a head-mountable device (HMD) 104. In the example of FIG. 10, the HMD 104, being worn by a user 10, presents (e.g., displays) an SR setting according to various implementations. In the example of FIG. 10, the SR setting corresponds to (e.g., displays) the intermediary content item 220. In some implementations, the HMD 104 includes an integrated display (e.g., a built-in display) that displays the SR setting. In some implementations, the HMD 104 includes a head-mountable enclosure. In various implementations, the head-mountable enclosure includes an attachment region to which another device with a display can be attached. For example, in some implementations, an electronic device can be attached to the head-mountable enclosure. In various implementations, the head-mountable enclosure is shaped to form a receptacle for receiving another device that includes a display (e.g., the electronic device). For example, in some implementations, the electronic device slides/snaps into or otherwise attaches to the head-mountable enclosure. In some implementations, the display of the device attached to the head-mountable enclosure presents (e.g., displays) the SR setting (e.g., the intermediary content item 220). In various implementations, examples of the electronic device include smartphones, tablets, media players, laptops, etc. In some implementations, the controller 102 and/or the HMD 104 include the emergent content engine 110 that generates the intermediary content item 220.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an,", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including a non-transitory memory and one or more processors coupled with the non-transitory memory:
extracting, from a content item, a set of actions performed by an action-performing element in the content item;
determining, by semantic analysis, a set of objectives for a synthesized reality (SR) agent based on the set of actions, wherein an SR representation of the SR agent corresponds to the action-performing element; and
training, based on the set of objectives, an SR agent engine that generates actions for the SR agent, wherein the training is complete when the actions generated by the SR agent engine are within an acceptability threshold of the set of actions extracted from the content item.

2. The method of claim 1, wherein the training comprises:
determining that the training is complete when the actions generated by the SR agent engine are within a degree of similarity to the actions extracted from the content item.

3. The method of claim 1, wherein the training comprises:
determining values of one or more parameters of the SR agent engine.

4. The method of claim 3, wherein the training comprises:
comparing the actions generated by the SR agent engine with the set of actions extracted from the content item; and
adjusting the values of the one or more parameters based on the comparison.

5. The method of claim 4, wherein an amount of adjustment to the values of the one or more parameters is a function of a degree of dissimilarity between the actions generated by the SR agent and the set of actions extracted from the content item.

6. The method of claim 1, further comprising:
extracting, from another content item, another set of actions that the SR agent performs in the other content item;
determining another set of objectives based on the other set of actions; and
further training the SR agent engine based on the other set of objectives.

7. The method of claim 6, wherein the training comprises:
determining that the training is complete when the SR agent engine generates a third set of actions that are within a degree of similarity to the set of actions extracted from the content item and a fourth set of actions that are within a degree of similarity to the other set of actions extracted from the other content item.

8. The method of claim 1, further comprising:
training, based on the set of actions, an emergent content engine that generates objectives for the SR agent.

9. The method of claim 8, wherein training the emergent content engine comprises:
determining that the training of the emergent content engine is complete when the emergent content engine generates objectives that match the set of objectives determined based on the set of actions extracted from the content item.

10. The method of claim 1, further comprising:
extracting another set of actions that another SR agent performs in the content item;
determining another set of objectives based on the other set of actions; and
training, based on the other set of objectives, another SR agent engine that generates actions for the other SR agent.

11. The method of claim 1, wherein the action-performing element performs actions that advance a plot in the content item.

12. The method of claim 1, wherein extracting the set of actions comprises:
performing scene analysis on the content item in order to identify the action-performing element and to extract the set of actions that the action-performing element performs in the content item.

13. The method of claim 1, wherein the SR representation includes an augmented reality (AR) representation.

14. The method of claim 1, wherein the SR representation includes a virtual reality (VR) representation.

15. The method of claim 1, wherein the SR representation includes a mixed reality (MR) representation.

16. The method of claim 1, further comprising:
determining a plot template that corresponds with the content item; and
providing the plot template to the SR agent engine during the training.

17. The method of claim 16, wherein determining the plot template comprises:
selecting the plot template from a plurality of plot templates based on the set of objectives for the SR agent and/or based on the set of actions performed by the action-performing element in the content item.

18. A device comprising:
one or more processors;
a non-transitory memory; and
one or more programs stored in the non-transitory memory, which, when executed by the one or more processors, cause the device to:
extract, from a content item, a set of actions performed by an action-performing element in the content item;
determine, by semantic analysis, a set of objectives for a synthesized reality (SR) agent based on the set of actions, wherein an SR representation of the SR agent corresponds to the action-performing element; and
train, based on the set of objectives, an SR agent engine that generates actions for the SR agent, wherein the training is complete when the actions generated by the SR agent engine are within an acceptability threshold of the set of actions extracted from the content item.

19. A non-transitory memory storing one or more programs, which, when executed by one or more processors of a device, cause the device to:
extract, from a content item, a set of actions performed by an action-performing element in the content item;
determine, by semantic analysis, a set of objectives for a synthesized reality (SR) agent based on the set of actions, wherein an SR representation of the SR agent corresponds to the action-performing element; and
train, based on the set of objectives, an SR agent engine that generates actions for the SR agent, wherein the training is complete when the actions generated by the SR agent engine are within an acceptability threshold of the set of actions extracted from the content item.

20. The non-transitory memory of claim 19, wherein the training comprises:
determining that the training is complete when the actions generated by the SR agent engine are within a degree of similarity to the actions extracted from the content item.

* * * * *